United States Patent
Muftic

[11] Patent Number: 5,943,423
[45] Date of Patent: Aug. 24, 1999

[54] SMART TOKEN SYSTEM FOR SECURE ELECTRONIC TRANSACTIONS AND IDENTIFICATION

[75] Inventor: Sead Muftic, Hasselby, Sweden

[73] Assignee: Entegrity Solutions Corporation, San Jose, Calif.

[21] Appl. No.: 08/573,033

[22] Filed: Dec. 15, 1995

[51] Int. Cl.⁶ .............................. H04L 9/00; H04G 1/00
[52] U.S. Cl. .................................. 380/25; 380/4; 380/21; 380/23
[58] Field of Search .................... 380/4, 23, 24, 380/25, 21; 235/380

[56] References Cited

U.S. PATENT DOCUMENTS

| | | | |
|---|---|---|---|
| 4,529,870 | 7/1985 | Chaum | 235/380 |
| 4,757,534 | 7/1988 | Matyas et al. | 380/25 |
| 4,888,798 | 12/1989 | Earnest | 380/4 |
| 5,199,066 | 3/1993 | Logan | 380/4 |
| 5,241,594 | 8/1993 | Kung | 380/4 |
| 5,461,217 | 10/1995 | Claus | 235/380 |
| 5,590,038 | 12/1996 | Pitroda | 235/380 X |
| 5,590,199 | 12/1996 | Krajewski, Jr. et al. | 380/25 |
| 5,594,233 | 1/1997 | Kenneth et al. | 235/492 |
| 5,604,801 | 2/1997 | Dolan et al. | 380/21 |
| 5,646,999 | 7/1997 | Saito | 380/25 |
| 5,677,955 | 10/1997 | Doggett et al. | 380/24 |
| 5,691,525 | 11/1997 | Aoki et al. | 235/380 X |
| 5,704,046 | 12/1997 | Hogan | 395/239 |
| 5,719,938 | 2/1998 | Haas et al. | 380/21 |
| 5,721,781 | 2/1998 | Deo et al. | 380/25 |
| 5,724,425 | 3/1998 | Chang et al. | 380/25 |
| 5,724,426 | 3/1998 | Rosenow et al. | 380/25 |

*Primary Examiner*—Harshad Patel
*Assistant Examiner*—Robin C. Clark
*Attorney, Agent, or Firm*—Foley & Lardner

[57] ABSTRACT

Smart token technology, using a smart card, PCMCIA card or any other medium containing storage or processing capability is used to facilitate a variety of secure business transactions, including those which might occur over an unsecured network such as the Internet. Application programs can obtain a variety of smart token services using a common application programming interface. Applications of the smart token technology to electronic cash, banking, credit, computer and network access, software distribution, medical handling and issuance of credentials are presented.

4 Claims, 29 Drawing Sheets

FIG. 4

| MASTER FILE 400 | FABRICATION FILE 405 | MANUFACTURER FILE 410 | PIN FILE 415 |
|---|---|---|---|
| USER FILE 420 | PRIVATE KEYS FILE 425 | PUBLIC KEYS FILE 430 | KEYS EXCHANGE FILE 435 |

OPTIONAL FILES:

| SYMM KEYS FILE 440 | USER CERTIFICATE FILE 445 | ISSUERS CERTIFICATE FILE 450 | APPLICATION ID FILE 455 |
|---|---|---|---|

NUMERIC VALUES AND BIT MASK FILES: 460

| DOMAIN 1 | DOMAIN 2 | DOMAIN 3 | |
|---|---|---|---|
| DOMAIN 4 | DOMAIN 5 | DOMAIN 6 | |
| . . . | OTHER ELEMENTARY FILES | | |

FIG. 23

2300 — DOMAIN NAME: CREDENTIALS

NAME OF ISSUER:

NAME OF GRANTEE:

DOB:                                POB:

SSN:

SIGNATURE OF ISSUER:

EXPIRATION DATE:

2310 — PRIVILEGES:

2320 — RESTRICTIONS:

2330 — FUNCTIONS:

FIG. 24

2400 DOMAIN NAME: MEDICAL

NAME OF PATIENT:

DOB:                    POB:

SSN:

2410 PERSONAL INFORMATION:

HEIGHT:

WEIGHT:

HAIR COLOR:

EYE COLOR:

⋮

2420 ALLERGIES/MEDICATIONS:

2430 PRESCRIPTIONS    SIGNATURE OF DOCTOR    SIGNATURE OF
                         WITH CERTIFICATE       PHARMACY

2440 DOCTORS VISITS:

2450 HOSPITALIZATIONS:

2460 FUNCTIONS:
    EDIT_INFORMATION
    GET_PRESCRIPTION
    FILL_PRESCRIPTION

FIG. 27

2700
DOMAIN NAME: ELECTRONIC CASH

OWNER NAME (optional):

CURRENT VALUE:

2710
ISSUER NAME AND ISSUER NUMBER:

NATIONALITY:

FACE AMOUNT:

AMOUNT REMAINING:

ISSUERS SIGNATURE:

- - - - - - - - - - - - - - - - - - - - - - - - - - - - -

HISTORY:

| AMOUNT | TRANSFEREE | DATE/TIME |

(1 of N RECORDS)

2720
RECEIPTS FOR CASH EXPENDED:

2730
FUNCTIONS:
    GET_CASH
    PAY_CASH

SMART TOKEN SYSTEM FOR SECURE ELECTRONIC TRANSACTIONS AND IDENTIFICATION

This application is related to U.S. Pat. No. 5,745,574 in the name of the same inventor and entitled SECURITY INFRASTRUCTURE FOR ELECTRONIC TRANSACTIONS, which is incorporated herein by reference in its entirety.

TECHNICAL FIELD

This invention is directed to the field of computer communications systems and more particularly to electronic transactions systems which utilize a smart card or smart token in ensuring the authenticity and privacy of communications and information and for the identification of the holder of the smart token.

BACKGROUND ART

As advances in technology permit continued increases in the degree of miniaturization of electronic components, smart cards have been developed which include a processor and/or memory built into a transport medium the size of a typical credit card. The processors in these cards can be programmed like any other computer to perform desired functions. Smart card readers are known which permit one to both read the contents of a smart card, but also to interact with the smart card to change its contents and to accomplish cooperative functions which can range from the simple to the sophisticated.

A number of applications of smart card technology have been proposed. However, only relatively few have been actually implemented and those that have, have been limited mainly to a single subject matter domain.

Automatic teller machine banking is well known in the art by which one accesses a bank account through the use of a bank card or a credit card and a personal identification number (PIN). Many account functions can be performed using ATM's, however, many cannot. Further, there is inconvenience associated with physically travelling to a nearby ATM machine in order to obtain banking services.

Some banks provide on-line access to some account information, which might be accessible from a user's personal computer, but these systems do not permit many important and desirable account functions, e.g. cash withdrawals.

Credit cards are also well known in the art. A credit card issuer provides a line of credit to a card holder, typically, and the card holder draws on that line of credit to make purchases from merchants who accept the card. The merchants can obtain cash value from the credit card issuer almost immediately at the cost of a service fee or percentage.

Over the course of a lifetime, a person may accumulate a number of credentials which serve, typically, as prerequisites for other activities. For example, a person obtains a driver's license upon establishing certain information about himself and by demonstrating skill in certain aspects of the regulatory scheme and competence in the handling of motor vehicles. Similarly, graduation from high school or from college results normally in a diploma which is normally a formal document signed and sealed by the educational institution indicating compliance with their requirements for a degree or for graduation.

Also associated with each individual is a set of information which is typically considered confidential regarding for example that individual's medical history and medical status.

There have been proposals for the creation and use of electronic money. However, wide spread usage of the proposals has not been achieved, perhaps because of the complexities associated with utilizing the technology and because of the capital investment required to equip commercial establishments with terminals which can accept and process electronic money.

A number of schemes have been utilized to ensure only authorized access to computer systems and computer software. Typically, the systems utilize a log-on procedure which requires the user identification and a password prior to permitting access. However, passwords are subject to being hacked and user ID's are frequently standardized.

DISCLOSURE OF THE INVENTION

The invention disclosed herein has as a purpose the application of smart token technologies to the above endeavors in a practical and highly secure way.

The invention disclosed herein has an advantage over prior art smart token implementations in that it integrates information from a plurality of domains and makes them accessible on a common smart token.

Another advantage of the invention is that the functions implemented on a token can be invoked in a manner which is independent of the underlying smart card and smart card readers.

Another advantage of the invention lies in the ability to use smart cards with integrated circuit chips or PCMCIA cards as smart tokens.

Another advantage of the invention is that all application level procedures can be implemented utilizing a common standard application programming interface.

Another advantage of the invention is the ability of a user to be mobile and to logon from any computer in the system utilizing the user's smart token.

Another advantage of the invention resides in a flexible token architecture.

Another advantage of the invention lies in a software architecture particularly suited for use with smart tokens.

Another advantage of the invention lies in an economical hardware architecture which enables smart token technology to be utilized inexpensively and as an add on to existing computer systems.

Another advantage of the invention lies in the use of strong authentication protocols when using a smart token when accessing network or computer resources.

Other advantages of the invention lie in the use of a smart token system in which multiple application domains can be accessed sequentially or concurrently.

Another advantage of the invention lies in the use of a smart token which handles identification and credentials, creates and verifies digital signatures, supports key and access management, the functions of a electronic wallet and an electronic safe, protected software distribution and secure access to games, interactive t.v., telephony encryption, and more.

One principal advantage of the invention is the ability to utilize smart tokens to undertake secure financial and other electronic transactions over a publicly accessible network.

Another advantage of the invention lies in the ability to carry medical records or other private data stored on a smart token in a secure manner which will facilitate and improve the efficiency of medical personnel and the performance of their administrative functions.

Another advantage of the invention resides in automatic and controlled access to network applications utilizing a smart token.

Another advantage of the invention lies in the ability to link a smart token irrefutably to one and only one individual or to multiple authorized holders, if needed.

Another advantage of the invention resides in the creation and processing of electronic cash which can be securely transferred across a network or which can be used locally with the same degree of convenience as currency and coinage.

Another advantage of the invention is the integration of smart token technology with a public key infrastructure to facilitate secure electronic transactions over an unsecure network.

These and other advantages and objects of the invention are achieved in accordance with the invention by providing a computer system for using smart tokens for secure and authorized electronic transactions. The computer system has a plurality of computers each capable of cooperating with other computers over an unsecured network with at least some of the computers being equipped with smart token readers and smart token software drivers, accessible from an application through a common application programming interface. The smart tokens can be a smart card, a PC card or any personal digital medium containing memory or processing capability.

At least one of the plurality of computers has a plurality of drivers for respective smart token readers of different types and the correct driver is selected for a connected reader when activating the system. Similarly, at least one computer has a plurality of drivers for respective smart tokens of different types and the correct driver is selected for a token in use when activating the system. Some of the computers are related to other computers as part of a public key infrastructure.

Smart tokens have their memory formatted to include a plurality of application domains and the processor of at least one smart token is programmed to perform cryptographic functions and transformations based on at least one cryptographic algorithm. Application domains have separate internal data and access criteria and may be subdivided into subdomains with at least two subdomains having different internal data and access criteria.

The invention is also directed to a computer for using smart tokens for electronic transactions, including a processor, a network interface, a card reader and card reader interface, a user interface by which a user interacts with the processor, at least one computer program, and a common application programming interface for using services of the smart token reader or for accessing smart token internal data and functions in which at least one computer program accesses the smart token reader or smart token data and functions through the common application programming interface. The application programming interface also provides access to a set of secure transaction services, including secret key and/or public key cryptographic services. Such services may include secure electronic mail, secure communication services, secure browsers. and generation of digital signatures and/or validation of digital signatures.

The invention is also directed to a method of using a smart token system and a certification system implemented in a plurality of computers each capable of cooperating with other computers over an unsecured network and each related to other computers as part of a public key infrastructure, at least some of the computers being equipped with smart token readers, by generating transactions using smart tokens which are at least partially encrypted and/or digitally signed, verifying the validity of transactions which have been created using smart tokens, and validating public key information using said public key infrastructure.

The invention is also directed to a method of creating, storing and using a user's digital identity by creating and storing a digital user identification in a smart token, and using the digital user identification stored in the token for user identification in electronic transactions.

The invention is also directed to a method of creating and verifying digital signatures on electronic documents and transactions, by creating digital signatures using public key cryptography capabilities of a smart token, and verifying digital signatures using public key cryptography capabilities of the smart token and a public key infrastructure.

The invention is also directed to a method of obtaining electronic cash from a financial institution and storing it in a smart token, by opening an electronic cash application domain of said smart token; retrieving and filling out an electronic withdrawal slip; electronically signing the withdrawal slip using the smart token; transferring the withdrawal slip with a digital signature to a financial institution; and receiving electronic cash from the financial institution and storing it in an electronic cash application domain of the smart token.

The invention is also directed to a method of making an electronic cash payment using a smart token, by opening an electronic cash application domain of the smart token; preparing a copy of at least part of a signed electronic cash entry; entering the amount of the payment on the copy; electronically signing the copy; and transferring a signed copy to the payee. A copy of the signed copy may be maintained in the smart token. After authorization from a financial institution is received the electronic cash is transferred to the payee, The electronic cash may be either identified or anonymous.

The invention is also directed to a method of creating electronic checks for an issuer using a smart token of the issuer, by opening a checking application domain of a smart token of the issuer, displaying an electronic check form at a user workstation, filling in at least amount and payee information on the check form, applying a digital signature to the electronic check form, and transferring the electronic check form and digital signature to a smart token or computer of an issuee. The electronic check form preferably contains at least institution name and/or institution number of the institution on which the check is drawn. A copy of the electronic check form and/or an electronically signed receipt from the issuee is stored on the smart token of the issuer.

The invention is also directed to a method of making credit card purchases using a smart token of a credit card holder, by opening a credit card application domain of a smart token of the holder, displaying an electronic charge slip, filling in at least amount and payee information on the charge slip, applying a digital signature to the electronic charge slip, and transferring the electronic charge slip and digital signature to a smart token or computer of a seller. The electronic charge slip contains at least company name and/or company number of the company issuing the credit card. A copy of the electronic charge slip and/or an electronically signed receipt is stored on the smart token of the issuer.

The invention is also directed to a method of making electronic credit card payments using a smart token of a credit card holder, by opening a credit card application domain of a smart token of the holder and determining the balance due, opening a checking application domain on the smart token of the holder, displaying an electronic check form, filling in at least amount information on the check form, applying a digital signature to the electronic check form, and transferring the electronic check form and digital signature to a smart token or computer of the company issuing the credit card.

The invention is also directed to a method of receiving electronic credit for goods returned to a seller using a smart token, by opening an application domain used to purchase the goods; transferring a copy of an electronic receipt for the transaction by which said goods were purchased to a computer of said seller; determining whether a refund will be made by cash, check or credit card credit; opening one of electronic cash, checking or credit card application domains of the smart token based on the results of the determining step if not already open; storing a refund entry in an application domain opened as a result of the determining step; and storing a modified receipt in said application domain used to purchase the goods. The modified receipt is stored as a new receipt and the receipt for the transaction by which the goods were purchased is marked as invalid.

The invention is also directed to a method of obtaining access to computer or network resources using a smart token, by opening an application domain of a smart token used for computer or network access; encrypting a password or other access credentials read from the domain; sending a logon identification and encrypted password or other access credentials to the computer or network resource for which access is desired. A set of privileges may also be transferred from the token to the computer or network resource. A signature associated with access credentials used for user authorization is validated before access is granted. Sending a logon identification and access credentials to the computer or network resource for which access is desired is done by sending a user public key certificate stored on the token together with a user identification and a user random number to the computer or network resource; receiving from the computer or network resource the identity of the computer or network resource, a public key certificate of a target resource, a signed copy of the user random number and a second random number generated by the computer or network resource; verifying a signature to the user random number; and signing the second random number using the public key of the computer or network resource obtained from a certificate and returning the second random number with signature to the computer or network resource.

The invention is also directed to a method of authorizing an activity in a computing environment only to those persons authorized to engage in the activity by opening an authorization credentials application domain on a smart token; scanning a plurality of authorization credentials stored therein for an authorizing credential; and if an authorizing credential is found, authorizing the activity.

The invention is also directed to a method of preventing use of software modified without authorization and unauthorized access to software without possession of a smart token, performed by software manufacturer, author or owner, by generating a pair of digital signature keys for each authorized user; personalizing a smart token for each authorized user of the software and storing the digital signature keys on the token; including a start-up routine within the software; producing a hash value for the software and encrypting the hash value using the user's public key to create a digital seal; and appending the digital seal to the software before distribution such that when the software is loaded and executed the start-up routine calculates a hash value from the loaded software, compares the calculated hash value with the hash value decrypted from the digital seal using the private key on the token and when they are identical permitting execution of the software. The steps of generating a pair of digital signature keys for each authorized user and personalizing a smart token for each authorized user and particular software to be protected, performed by software manufacturer, author or owner, includes generating for each authorized software distributor a pair of digital signature keys and a distribution credential containing a counter holding a value indicating the maximum number of authorized copies of software to be distributed; using the distribution credential to generate user authorization credentials in a quantity no greater than said value by decrementing said counter each time a user authorization credential is generated until the counter reaches zero and thereafter preventing further generation of the user authorization credentials; distributing one user authorization credential with each authorized copy of the software; and preventing the possibility to activate the copy of the software without using a valid user authorization credential.

The invention is also directed to a method of displaying a copyright notice on software or any digital document by applying a digital signature of the manufacturer, author or owner to software or to the digital document at the time it is prepared for distribution; permitting execution of the software or access to the the document only after successful verification of the author's signature using a public key of the software manufacturer or of the document author; and not permitting access to the public key without display of a copyright notice or treating the access to the public key as the act of copyright recognition.

The invention is also directed to a method of facilitating authorized handling of any private and proprietary data and information of a person using a smart token, by storing at least partial private and proprietary information relating to the person on the smart token; retrieving the private and proprietary information as needed; storing authorizations for application procedures handling private and proprietary information electronically signed by an appropriately authorized person on said smart token; and performing those application procedures only when a signed authorization is present. The private and proprietary information may be personal medical information, personal financial information or any personal information and application procedures may be medical procedures, financial procedures or authorized procedures requiring a power of attorney, respectively. Electronic signing by an authorized person is preceded by activation of a smart token owned by the person and by validation of a signature to the authorization.

The invention is also directed to a method for providing smart tokens administration, maintenance and supporting services, by formatting smart tokens, initializing the smart tokens, personalizing the smart tokens, securely and reliably distributing the smart tokens, unblocking the blocked smart tokens, replacing lost or damaged smart tokens and/or renewing smart tokens from a smart tokens archive.

Still other objects and advantages of the present invention will become readily apparent to those skilled in the art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

FIG. 4 shows an exemplary data architecture of a smart token in accordance with the invention.

FIG. 23 is a representation of an exemplary layout of a credentials domain.

FIG. 24 is a representation of an exemplary layout of a medical domain.

FIG. 27 is a representation of an exemplary layout for an electronic cash domain.

BEST MODE FOR CARRYING OUT THE INVENTION

Figure 1:
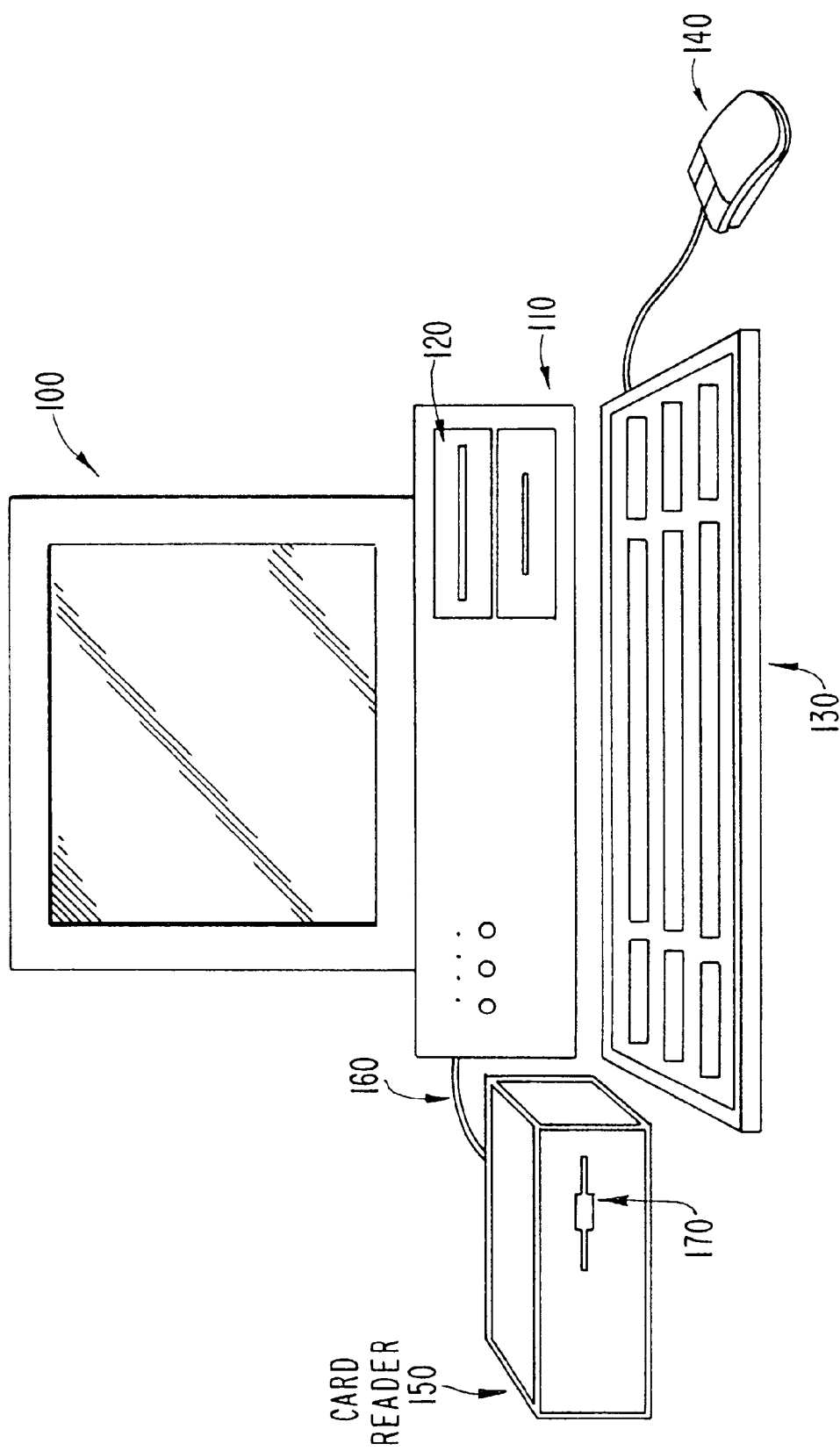
FIG. 1 is a drawing of a computer incorporating smart token hardware.

FIG. 1 is a drawing of a computer incorporating smart token hardware. In this exemplary illustration, the computer is equipped with the usual display 100, keyboard 130, mouse 140 and drives 120. In addition, the computer is equipped with card reader 150 which will both read and write smart tokens such as smart cards or PCMCIA cards. Preferably, the cards are smart cards and card readers read/write smart cards. Although the term "reader" is used, it is to be understood that the term, as used herein, is intended to cover the writing of smart tokens as a necessary and inherent part of a "reader". Card reader 150 is illustrated as connected to the computer over cable 160 which connects to a port on the computer, such as an RS 232 port or via any other port or by a wireless connection.

Card readers may be external devices connected to computers, as illustrated in FIG. 1, or they may be built in to other devices such as CPU 110, telephones, vending machines, or almost any computer equipped device.

Although card reader 150 is equipped with a slot 170 for insertion of a smart card, smart card readers are also available which remotely sense the presence of a smart card in the vicinity of the reader and communicate with the smart card utilizing wireless technologies. In some such remote sensing card readers, the card readers broadcast an RF energy signal which is detected by the smart card and a response is sent from the smart card back to the remote sensing card reader. An interchange of data may then occur in both directions over the wireless link between the smart card and the reader. Some card readers are equipped with a keypad and display.

Figure 2:
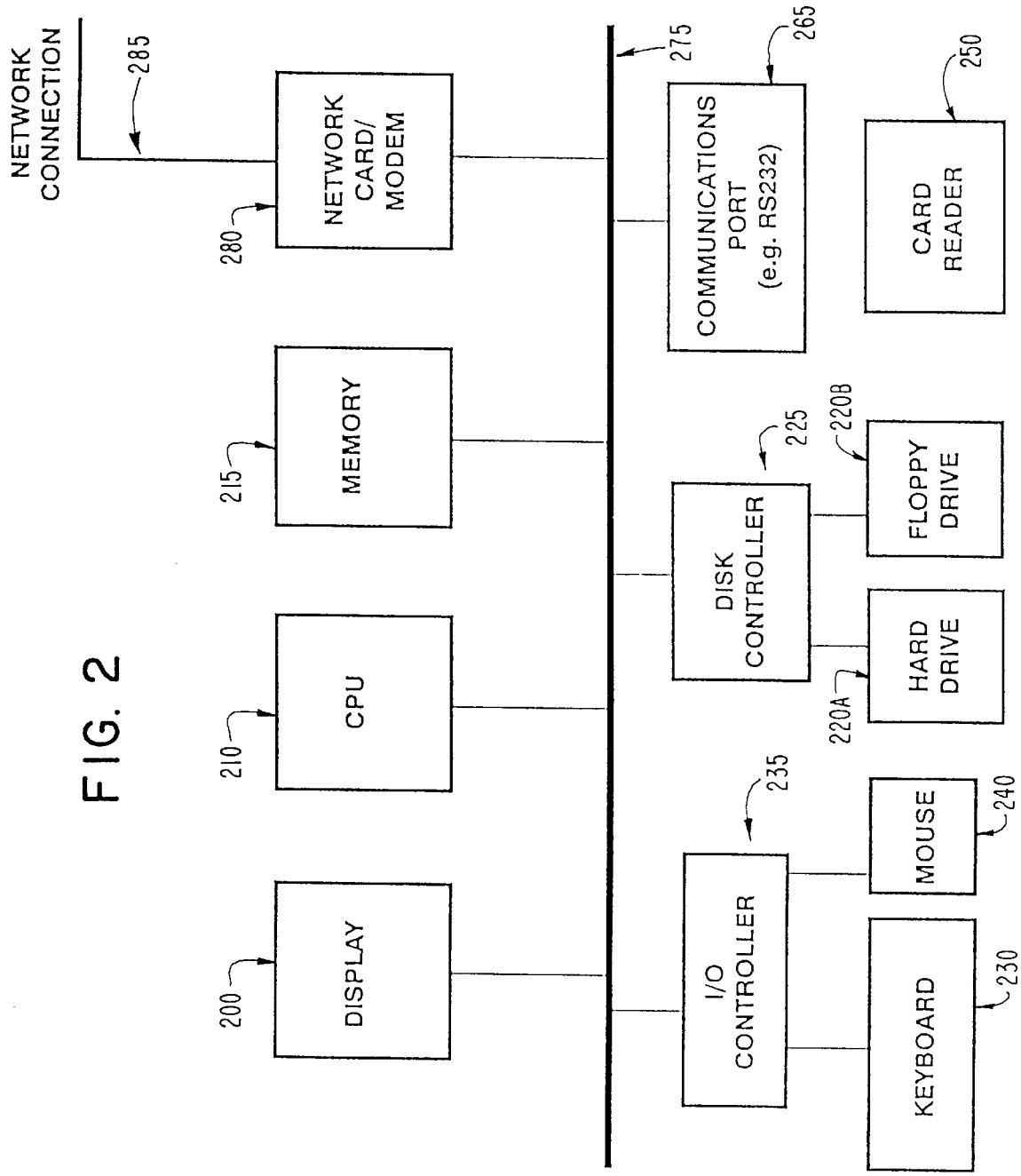
FIG. 2 is a block diagram of an exemplary hardware architecture of a user workstation extended with a smart token reader.

FIG. 2 is a block diagram of a exemplary hardware architecture for a computer incorporating smart token technology of the invention. CPU 210, keyboard 230, mouse 240 and card reader 250 all correspond to items shown in FIG. 1. I/O controller 235, disk controller 225, memory 215, RS-232 port 265 and network card/modem 280 are not shown in FIG. 1 but are commonly found in computer systems and are well known. Each of the devices shown in FIG. 2 intercommunicate over bus 275 either directly or over their respective interfaces or controllers.

One type of smart card reader which is preferred is the model ACR card reader from AND corporation. It is a versatile, fast, reliable smart card interface which conforms to ISO 7816 built into a housing fit for desk top use. It has a standard 9-PIN serial interface cable, an AC adaptor, user's manual and software libraries on floppy disk. It connects to a computer via a standard RS 232 serial port. It handles any smart card communication speed. It is provided with function library for MS DOS, MS windows, and QNX environments. Within those environments, libraries provide for the basic ACR reader functionality, basic ISO 7816 functionality and card specific functionality for a variety of different smart cards. The reader can accommodate new card types as they become available by providing additional libraries.

Typical cards, suitable for use with the invention, which can be accommodated by the AND card reader include the Schlumberger ME 2000 card, the Gem Plus MCOS card family, and the Siemens SLE 44 family of cards.

The ACR is also available in an OEM version for integration into other systems in a built-in form. A number of different card acceptors (170 in FIG. 1), which may be either passive, semi-active or active, are available for use with the ACR.

An alternative embodiment of the invention would utilize a PCMCIA card and PCMCIA card reader in lieu of the smart card technology just described.

Figure 3:
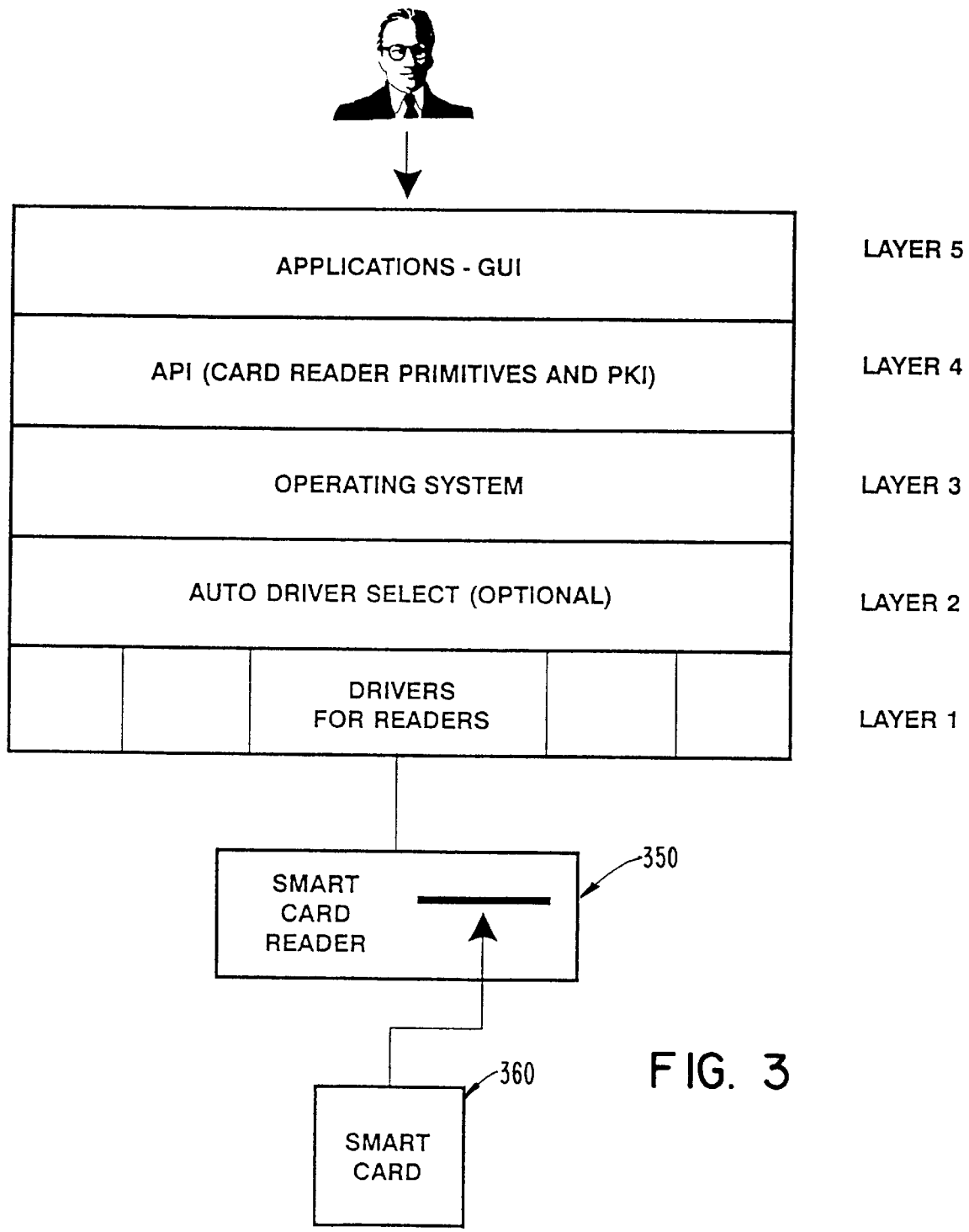
FIG. 3 shows the software architecture of a computer and smart token reader in accordance with the invention.

FIG. 3 shows the software architecture of a computer and smart token reader in accordance with the invention. Smart card reader 350 and smart card 360 are shown to illustrate the relationship to the layers of the software architecture. In the software layer closest to the hardware, namely layer 1, a plurality of drivers for different kinds of smart card readers are shown. Preferably, drivers for each of the major manufacturers of smart card readers are installed and the driver for the particular smart card reader in use is selected for handling the interface to the smart card reader.

Layer 2 illustrates automatic driver select software, which, although optional, permits automatic selection of a driver from layer 1 which is compatible with a smart card reader 350 installed in the system. Typically, this selection can be made by sequentially activating drivers in an interrogation/response mode to see which driver is compatible with smart card reader 350 or, alternatively, by checking a configuration file, either generated automatically when the computer boots or generated manually as equipment is installed, which is permanently stored. Thus, automatic driver selection software of layer 2 has a number of possible mechanisms which can be utilized to select the proper driver for interfacing smart card reader 350 with remainder of the system.

Layer 3 represents an operating system which preferably contains a graphical user interface. Hardware services are normally provided through calls to the operating system and the drivers are written to be compatible with the operating system in use.

Layer 4 is a standardized application programming interface which permits the applications of layer 5 to have a consistent interface regardless of changes in the underlying smart card technology (including smart card reader 350 and smart card 360). Thus, applications can be developed without regard to the underlying hardware and therefore be transportable from system to system because of the standard application programming interface. The application programming interface illustrated at layer 4 includes not only certain primitives designed for invoking functions of smart card readers directly but aggregations of those primitives, as well, to perform standard higher level functions. In addition, the application programming interface preferably also includes the application programming interface disclosed in the U.S. Pat. No. 5,745,574, identified above so that security functions may be invoked directly and conveniently as well.

Application programs illustrated typically at layer 5 utilize the services described in layers 1–4 for accomplishing the end results desired. Several applications of the smart card technology disclosed herein are disclosed in some detail to illustrate how the invention is to be used.

FIG. 4 shows an exemplary data architecture of a smart token in accordance with the invention.

Internally in the token, data are called elementary objects. Elementary objects may be organized in groups which are called elementary files. Some files are mandatory to comply with specifications of a standards process or with system wide design whereas others are optional.

Files may be organized in groups which may be called sections, directories or domains. Each domain (directory) may have its own activation and access test and access tests may be tailored to groups of files or sub-domains having different privileges.

The standard elementary files which appear in each smart token are the following:

The master file 400 is a file which contains descriptions of all other elementary files. It reflects a token's structure, the data loaded into the token, and the token's processing capabilities.

The fabrication file 405 is a file containing the physical and logical characteristics of the smart token.

The manufacture file 410 is a file containing the characteristics of the smart token and its manufacturer.

The PIN file 415 is a file containing the user's personal identification number(s) (PIN) needed to activate the token and to unblock certain PIN-protected parameters stored in the token.

The user file 420 is a file containing the user's name and other user's identification parameters.

The private digital signature key (DSK) file 425 is a file containing the user's private digital signature key. The key is stored in a format suitable for the digital signature creation function.

The public digital signature key (DSK) file 430 containing a user's public digital signature key. The key is stored in a format suitable for digital signature verification function.

The key exchange file 435 is a file containing the parameters for the bilateral exchange of private keys (for example, the Merkle-Hellman protocol) and for discrete log cryptographic systems (for example, DSS), together with parameters reflecting the type of the user who is the owner of the token.

Optional files may be different for each type of smart token. Some common optional elementary files are the following:

The SYMM key file 440 is a file containing private keys to be used with symmetric encryption/decryption algorithms. The number of keys stored in this file is limited by the available memory space in the token. If the token is not used for any symmetric encryption, then this file may be omitted.

The user certificate(s) file 445 is a file containing user certificate(s), or the appropriate information derived from these certificates, possibly including partial or full user's certification chain(s).

The issuer(s) certificate(s) file 450 is a file which contains the certificate of the issuer(s) of the user's certificate(s) (certification authority). If the user is not linked in any certification hierarchy, then this file may be omitted.

The application ID file 455 is a file containing the name and other characteristics of the application which uses a specific type of smart tokens. This file may be used for access control purposes.

The numeric values and bit masks file 460 is a file containing numeric values and bit masks. Numeric values may be used in different user applications, such as electronic money, as levels for access control, etc. The number of these numeric values stored in this file is limited by the available memory space in the token. Bit masks may be used in different user applications such as indicators of certain token owner characteristics, as access attributes, as processing flags, etc. An important set of optional files are the domain files, discussed hereinafter.

Preferably, in accordance with the invention, secret encryption keys and public and private keys and certificates are issued and managed as described in the public key infrastructure set forth in the U.S. Pat. No. 5,745,574 described above.

When received from the manufacturer, smart cards are essentially blank. They must be formatted, for example, to effectuate the data architecture shown in FIG. 4 and they must be personalized with the information for the specific user to which the card will be assigned.

In operation, when a card's presence is detected by the card reader, (either by inserting the card into a slot or by sensing return RF energy), the user is prompted to log in. If the user's log in matches the ID and the PIN number stored on the token, the token is activated for use. In less formal protocols, merely inserting the card will activate it for use. The application programming interface described in layer 4 of FIG. 3, comprises six groups of primitives which can be invoked by an application running on the computer. Some of those primitives correspond to primitives defined in the aforesaid U.S. Pat. No. 5,745, 574, some are typical operating system functions, some are in software libraries provided by the manufacturer of the card reader, and the remainder can be implemented routinely, given the descriptions of the functions provided. The six groups of functions include administration functions, token management functions, user and token functions, symmetric cryptographic functions, asymmetric cryptographic functions, and data manipulation functions.

The list of primitives and their functions are as follows:

Administration Functions

1. Register_Administrator is a function to establish a smart token of an administrator, and to generate an administrator's pair of digital signature keys, together with other internal smart token parameters.
2. Register_User is a function to establish a smart token for a user and to generate a user's pair of digital signature keys, together with other internal smart token parameters.
3. Re-Sign_Administrator_Token is a function to re-sign an administrator's certificate in the smart token after the execution of the Change_DS_Keys function in administrator's token.
4. Re-Sign_User_Token is a function to re-sign a user's certificate in the smart token by the smart tokens administrator after the execution of the Change_DS_Keys function in user's token.
5. Unblock_Token is a function unblocking of the smart token when blocked.
6. Display_Token displays a smart token's public internal data and structures, including information about particular mechanisms available in the token.
7. Copy_Token is a function for copying of one smart token to another smart token (for archive, escrow or backup).
8. De-Register_User is a function by which a user's smart token is "decoupled" from the certificate hierarchy and user's certificate becomes self-signed. This must be the case when a user is switching to another certification domain. Other functions may also be defined in this group at a user's or implementor's option.

Token Management Functions

1. Create_Directory is a function to establish a group of elementary files in the token (directory).
2. Change_Directory is a function to change from the current to the new directory,
3. Destroy_Directory is a function to delete an existing directory.
4. Create_Elementary_File is a function to create an elementary file in the directory.
5. Copy_Elementary_File is a function to copy the contents of one elementary file over another elementary file.
6. Delete_Elementary_File is a function to delete an elementary file in the directory.
7. Get_Directory_Attributes is a function to retrieve the access and other relevant attributes about the directory.
8. Change_Directory_Attributes is a function to change the access and other relevant attributes of the directory.
9. Get_File_Attributes is a function to retrieve the access and other relevant attributes about an elementary file.
10. Change_File_Attributes is a function to change the access and other relevant attributes of an elementary file. Other functions may also be defined in this group.

User and Token Functions

1. Activate_Token is a function for activation of the smart token by presenting activation parameters and performing all activation tests.
2. Verify_Token verifies whether the given activation parameters are the same as those presented to the Activate_Token function.
3. Define_Test (Change_PIN) is a function to define/change activation tests or their parameters, (an example may be changing the PIN in the smart token).
4. Change_DS_Key changes the smart token's digital signature keys and creates a new certificate(s).
5. Deactivate_Token deactivates the smart token. Other functions may also be defined in this group.

Symmetric Cryptographic Functions

1. Generate_SYMM_Key generate a random bit string or numerical value which may also be used as the private key for symmetric encryption/decryption.
2. Store_SYMM_Key stores random bits or random number in the smart token to be used as the symmetric encryption/decryption key.
3. Read_SYMM_Key reads from the smart token one of the stored random number (symmetric encryption/decryption keys).
4. SYMM_Encrypt encrypts data using some symmetric encryption/decryption algorithm and one of the internal or external symmetric encryption/decryption keys.
5. SYMM_Decrypt decrypts data using symmetric encryption/decryption algorithm and one of the internal or external symmetric encryption/decryption keys. Other functions may also be defined in this group.

Asymmetric Crypto Functions

1. ASYMM_Encrypt performs encryption using smart token owner's digital signature public key.
2. ASYMM_Decrypt performs decryption using smart token owner's private key.
3. Generate_Signature results in creation of the digital signature of data,
4. Verify_Signature results in verification of the digital structure. Other functions may also be defined in this group at a user's or implementor's option.

Data Manipulation Functions

1. Store_Value stores one of several numerical values into the smart token.
2. Read_Value reads one of several numerical values previously stored in the smart token.
3. Value_OP_CONST performs simple arithmetic operations using one of the internally stored numerical values and externally supplied numerical constant.
4. Store_Bit_Mask stores one of the several bits masks into the smart token.
5. Read_Bit_Mask reads one of the several bit masks previously stored in the smart token.
6. Bit_Mask_OP_CONST performs simple bit string operations using one of the internally stored bit masks and externally supplied bit string constant. Other functions may also be defined in this group.

Figure 5:
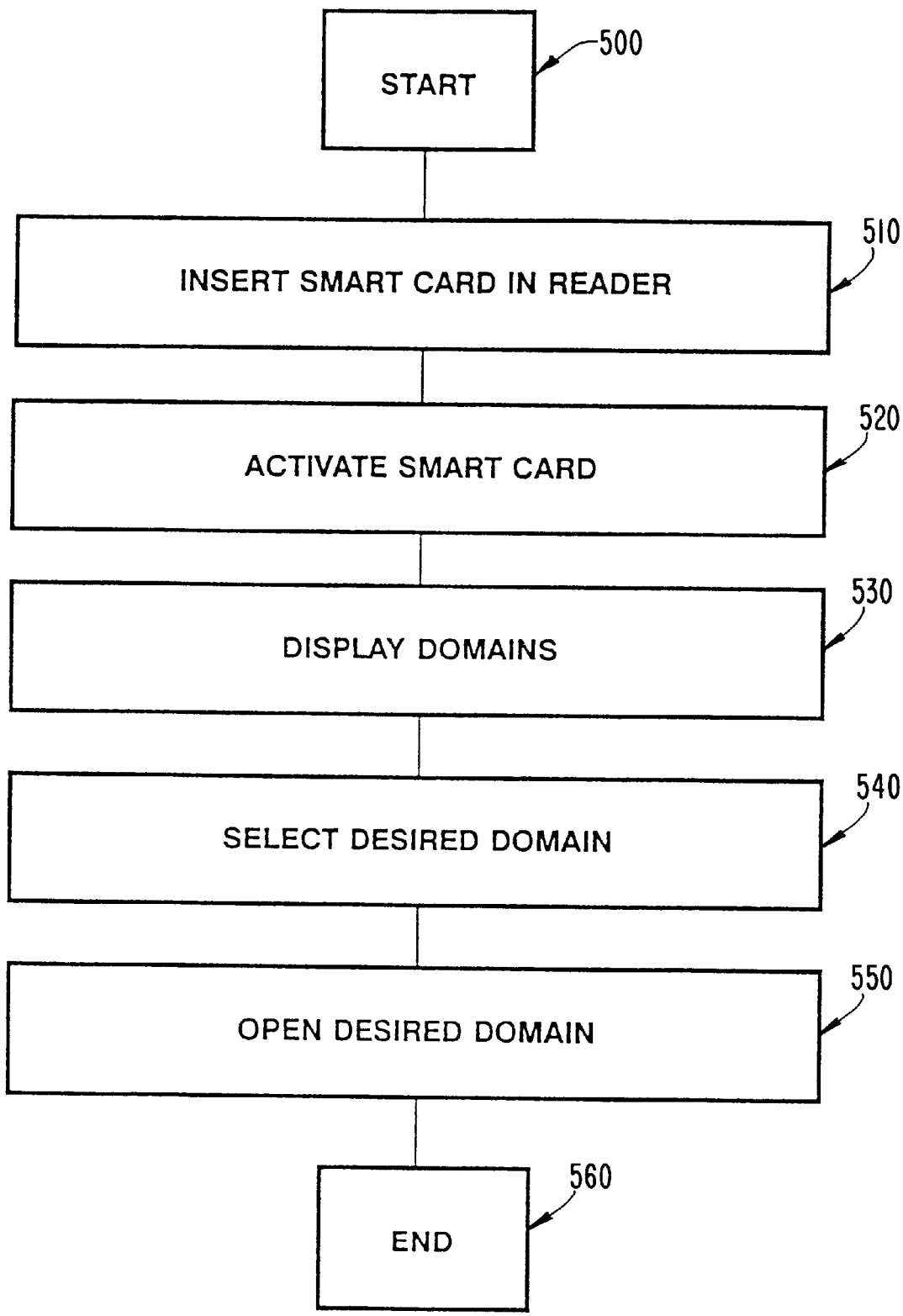
FIG. 5 is a flow chart of a process for opening a domain.

FIG. 5 is a flow chart of a process for opening a named domain. The process begins at 500 and a smart card is inserted into a reader or detected if a contactless reader is in use (510). The smart card is activated, 520, using, for example, the login and password procedure described above. A list of domains stored on the smart card is displayed (530) and the user selects the desired domain to be opened (540). The domain is opened (550) and the process ends.

Figure 6:
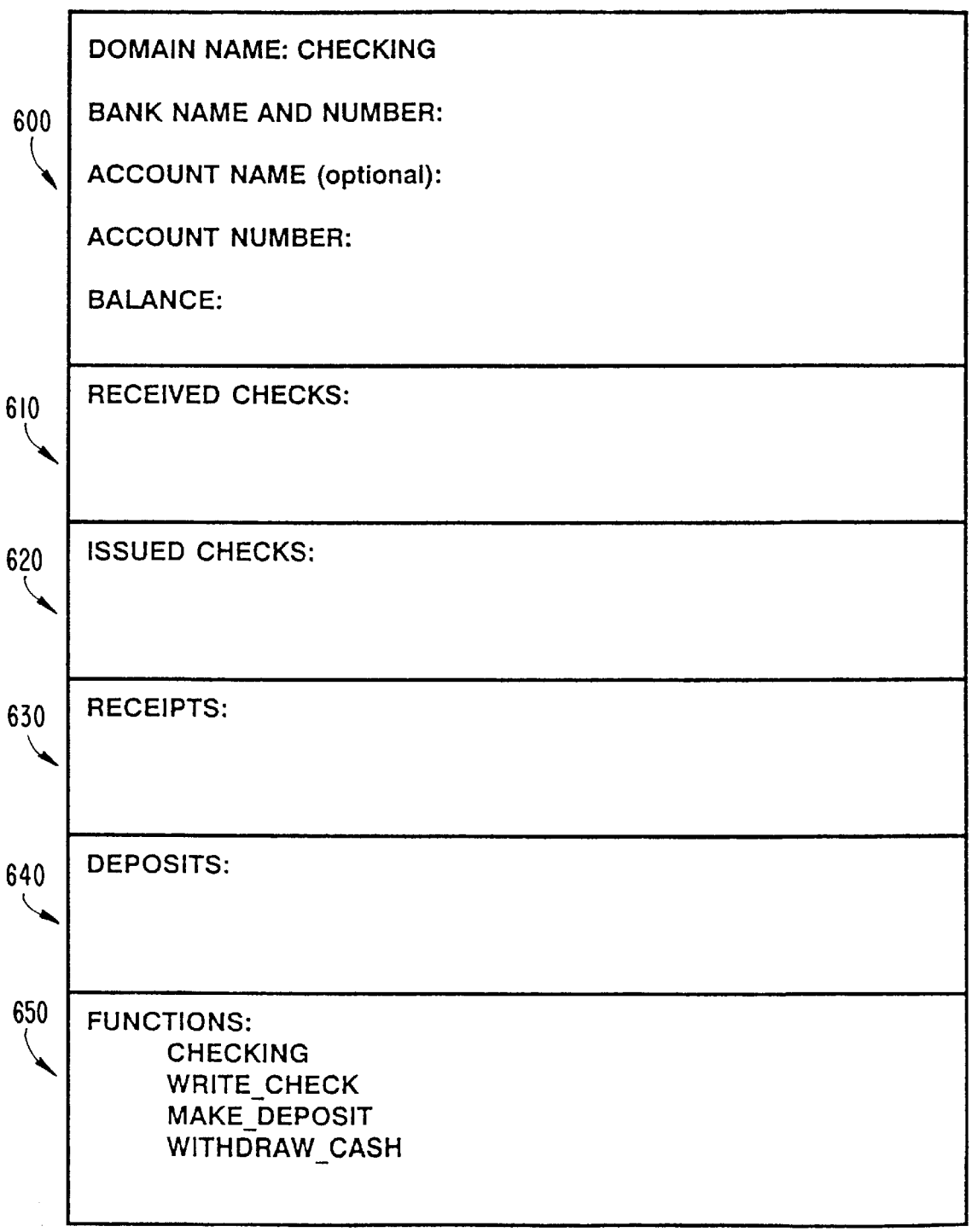
FIG. 6 is a representation of an exemplary layout for an electronic checking domain.

FIG. 6 is a representation of a exemplary layout of a checking domain. The layout of domains depicted here and elsewhere in this document is essentially a logical layout.

There is no particular necessity that the physical records be stored consecutively as long as the data items can be logically related. The data storage and retrieval mechanisms and the various data views that are employed for reading and writing data to and from the token overall can be applied to a domain subspace as well. These are well known standard database type functions.

The checking domain begins with a domain name which is used to distinguish it from other domains. This is the name utilized for display and selection of domain names when opening a domain. The checking domain is basically a data storage area or data structure dedicated to maintaining information about a single checking account. Therefore, in file 600, the bank name and bank number are included. An account name is optional if a list numbered account is utilized. An account number, however, is mandatory and an ongoing balance in the checking account is useful to maintain. In block 610, a list of received checks is maintained. A check is basically an order to a bank or other depository institution to pay money to a third party. Block 620 contains the list of checks issued by the account owner, namely the person whose smart token is being utilized to track the account. When a user engages in a purchase transaction using an electronic check, as described hereinafter, it will obtain an electronic receipt back from the seller. These are stored in block 630.

Periodically, a user will need to deposit checks he has received from other individuals, possibly together with cash, into the checking account. A record of each deposit is maintained in area 640 together with a signed indication from the bank indicating receipt of the deposit. A list of deposits and receipts is maintained here. A list of processes or functions which can be executed when the domain is open is optionally listed in block 650.

Figure 7:
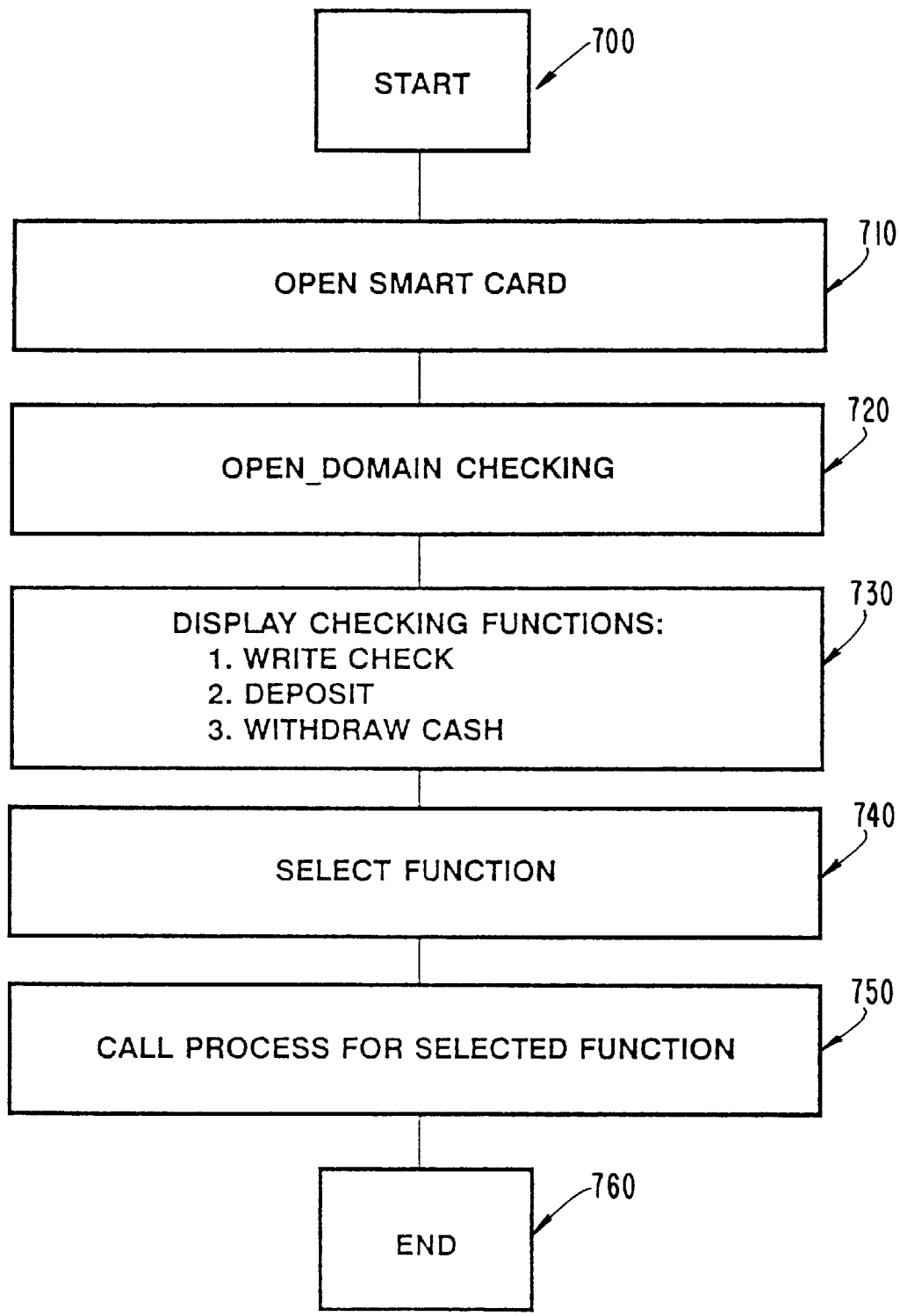
FIG. 7 is a flow chart of a process for opening a domain, using electronic checking as an example, for selection of certain processing functions for execution.

FIG. 7 is a flow chart of a process for opening a domain, using checking as an example, for selection of certain processing functions for execution. The process begins (700) and the smart token is opened (710). The Open_Domain process described with reference to FIG. 5 is invoked to open the domain checking (720). A list of checking functions is displayed (730) and one of them selected (740) and executed as indicated at (750) and the process ends. Other domains open in substantially the same way.

Figure 8:
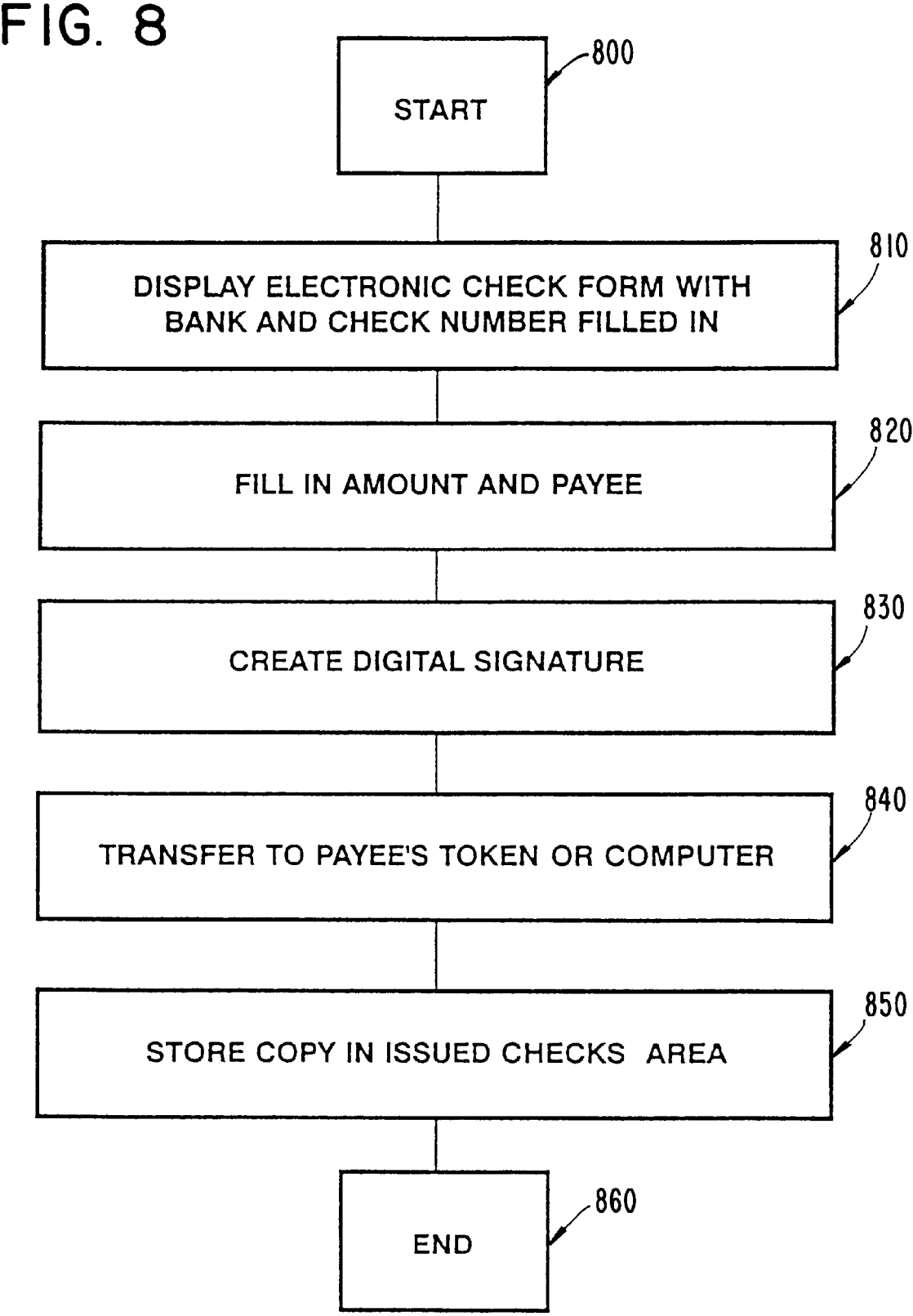
FIG. 8 is a flow chart of a Write_Check process.

FIG. 8 is a flow chart of a Write_Check process. The process starts (800) with display of an electronic check form with bank and check number filled in (810). The user fills in the amount and the payee (820) applies a digital signature (830). The electronically signed check is transferred to a payee's computer using e-mail or some other form of communications (840), and a copy of the signed check is stored in the issued checks area (850) of the domain and the process ends.

Figure 9:
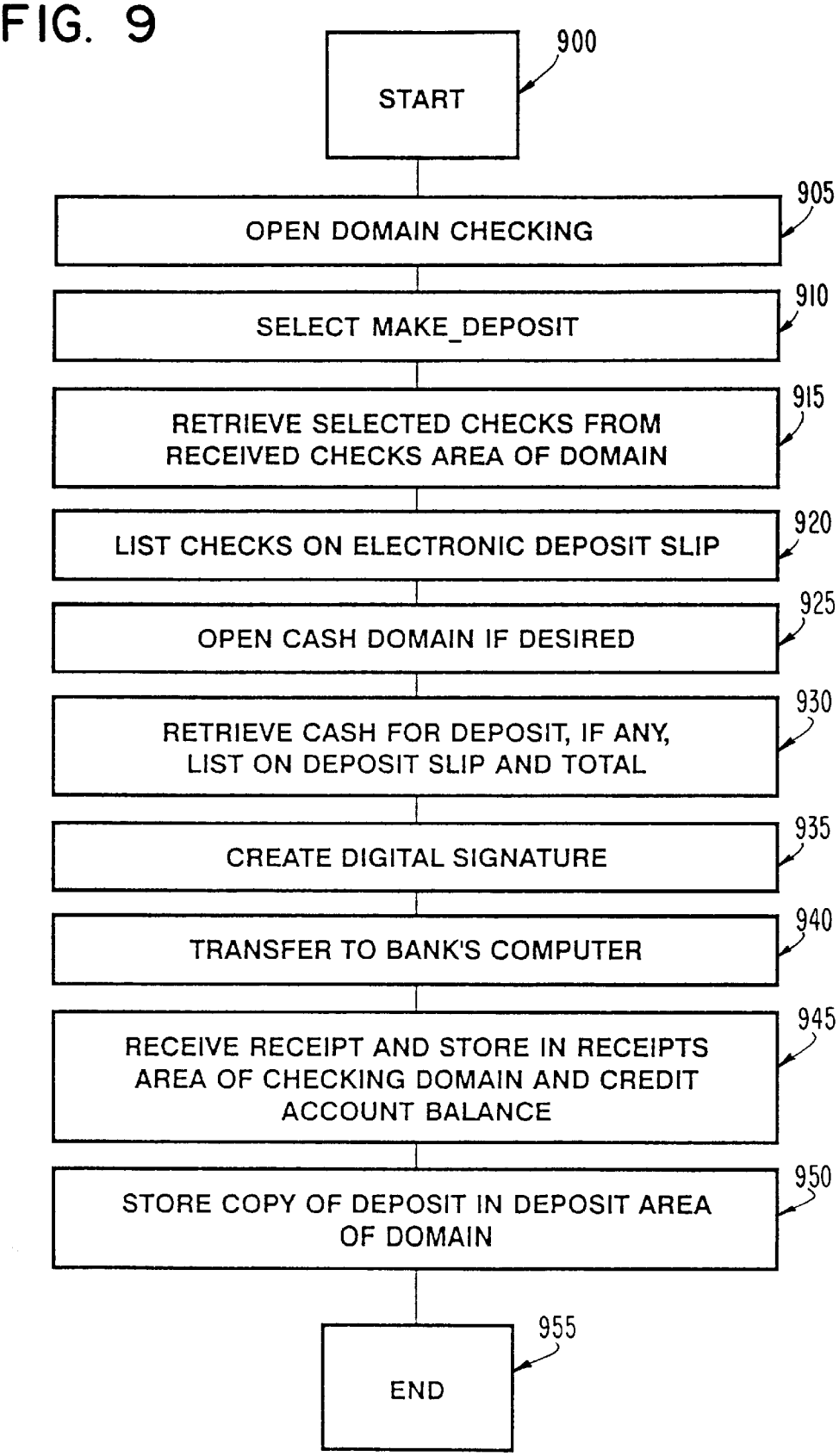
FIG. 9 is a flow chart of a Make_Deposit process.

FIG. 9 is a flow chart of a Make_Deposit process. The process begins at 900 and the checking domain is opened (905). The function Make_Deposit is selected (910), and the checks from the received checks area of the domain area are retrieved (915) and listed on an electronic deposit slip (920). If cash is to be deposited, the Open_Domain process is invoked with respect to the cash domain (925) and cash is retrieved for deposit, if any, and listed on the deposit slip. All items for deposit are totalled (930) and the deposit slip is signed using a digital signature (935). If the bank issues a separate receipt for the deposit, that receipt is received and stored in receipt area of the checking domain and the account balance credited with the amount of the deposit (945). A copy of the deposit is conveniently stored in the deposit area of the domain (950) for later reference in reconciling the account or for analysis. If the bank's methodology is to return a signed copy of the deposit as an indication of receipt, steps 945 and 950 may be combined and the signed copy of the deposit stored in the deposit area of domain and the process ends.

Figure 10:
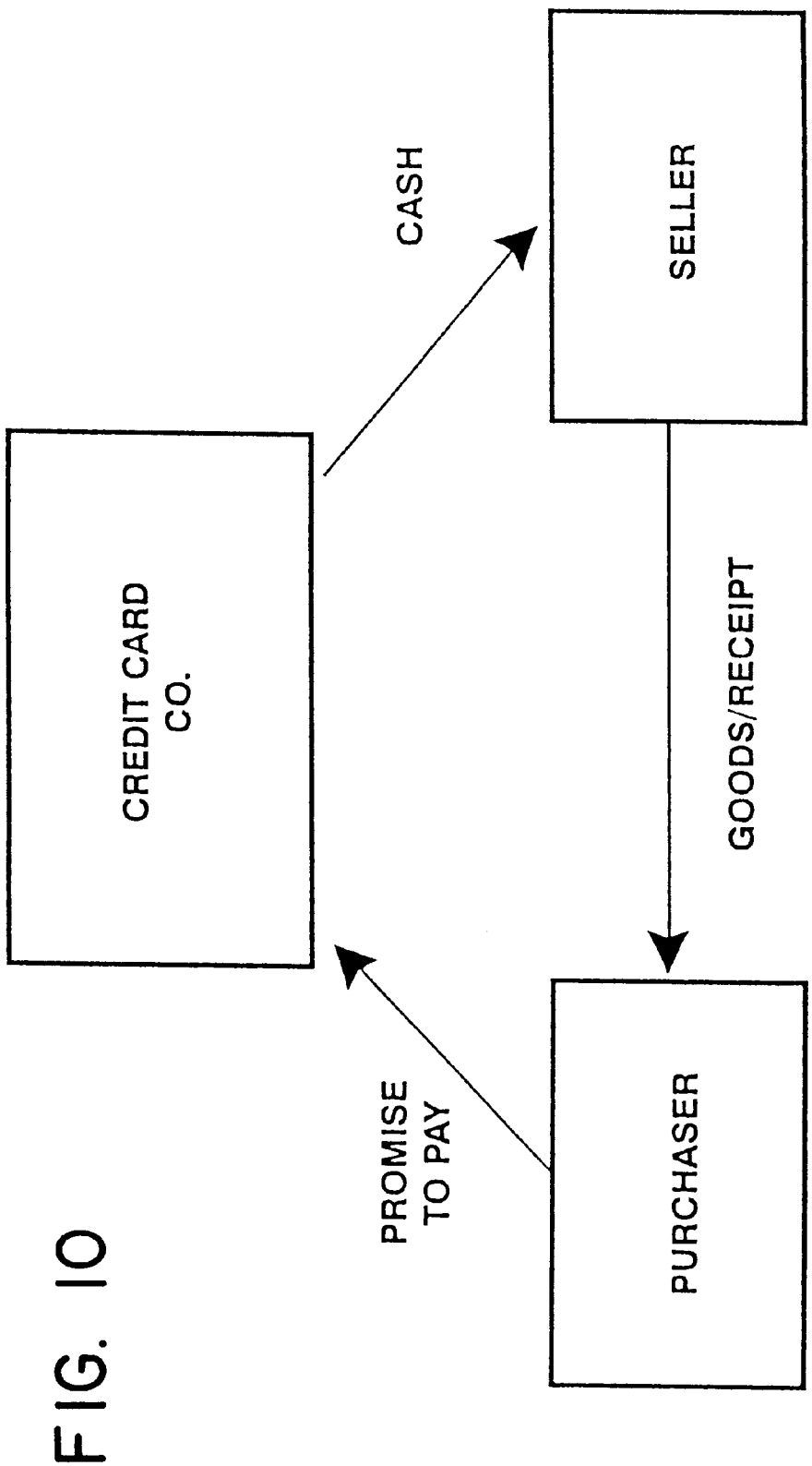
FIG. 10 is a representation of an electronic credit card transaction.

FIG. 10 is a flow chart of a credit card transaction. In a normal cash transaction, the purchaser gives cash to the seller in exchange for goods and a receipt. A credit card transaction is similar in that the seller provides goods and a receipt, but payment is made through the intermediary of a credit card company. The purchaser and the credit card company have a relationship by which the credit card company extends a line of credit to the purchaser. When the purchaser wishes to make a purchase using the credit card, the purchaser essentially promises to pay the credit card company the amount of the invoice, albeit at a later time. The seller, on the other hand, desires immediate cash. The seller exchanges the credit card slip for the face amount less a service fee. Thus, the seller gets immediate cash while the purchaser is not required to pay immediately, but nevertheless receives the goods at the time of the transaction.

Figure 11:
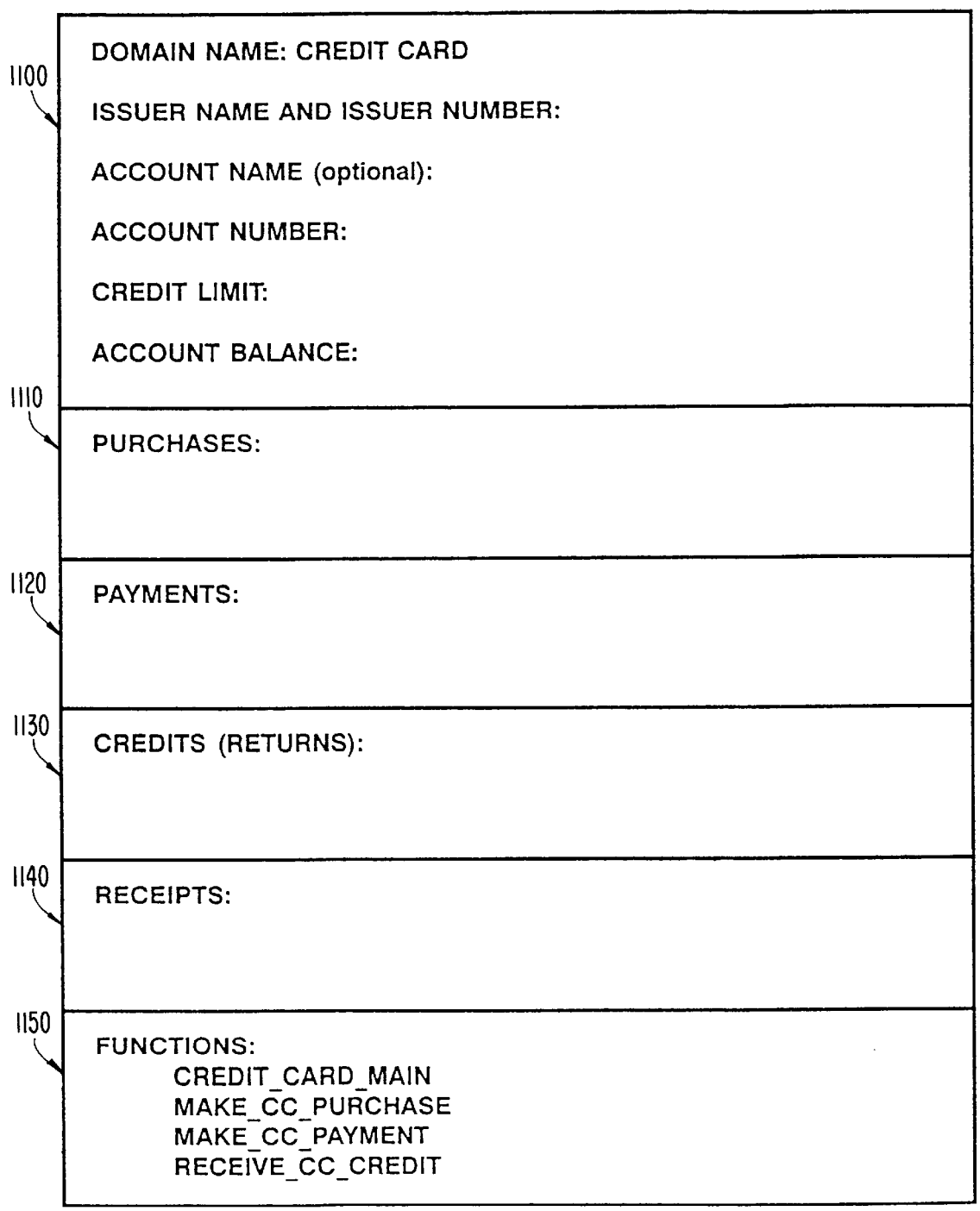
FIG. 11 is an exemplary layout of a Credit_Card domain.

FIG. 11 is an exemplary layout of a Credit_Card domain.

The similarities between this domain and the checking domain of FIG. 6 should be apparent. Block 1100 contains identifying information about the credit card company, the account name and number, the credit limit and the account balance. Area 1110 represents a list of purchases in corresponding amounts. Item 1120 contains a list of payments made to the credit card company on account. Item 1130 represents a list of returns or credits resulting from undoing all or part of a sale either by returning goods purchased or by rejecting services provided. Item 1140 is an area for storing receipts from the seller for later use. Item 1150 contains a list of the names of functions or processes utilized in conjunction with this domain.

Figure 12:
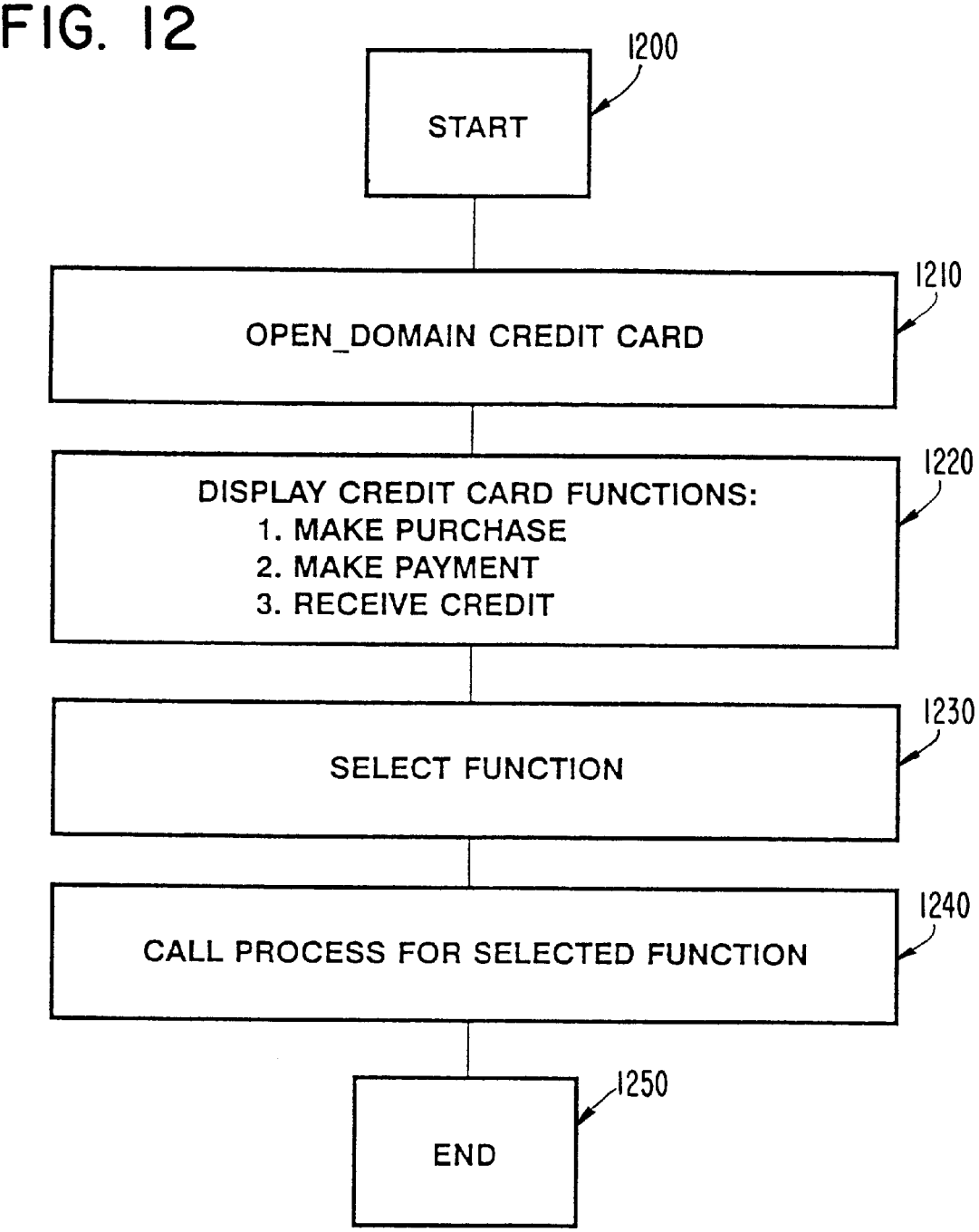
FIG. 12 is a flow chart of a Credit_Card_Main process.

FIG. 12 is a flow chart of a Credit_Card_Main routine which is analogous to that described in FIG. 7 and requires no further comment.

Figure 13:
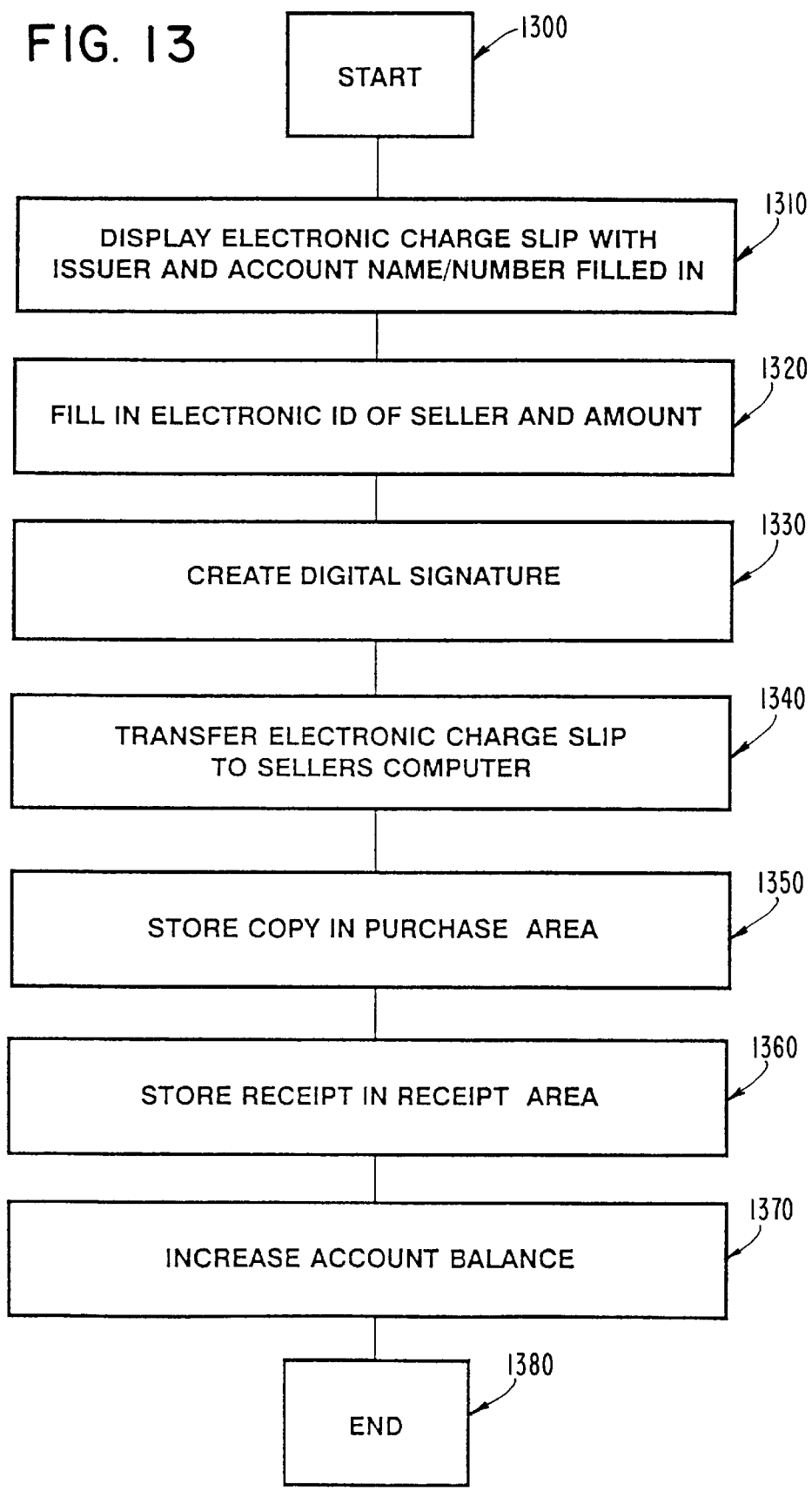
FIG. 13 is a flow chart of a Make_CC_Purchase process.

FIG. 13 is a flow chart of a Make_Purchase process. The process begins (1300) and electronic charge slip with issuer and account name/number filled in is displayed (1310). The user fills in the electronic ID of the seller and the amount (1320) and applies a digital signature (1330). The electronic charge slip is transferred to the seller's computer (1340) and a copy is stored in the purchase area (1350). An electronic receipt, electronically signed by the seller is returned, optionally, and is stored in the receipt area of the domain. The account unpaid balance is then increased by the amount of the purchase (1370) and the process ends.

Figure 14:
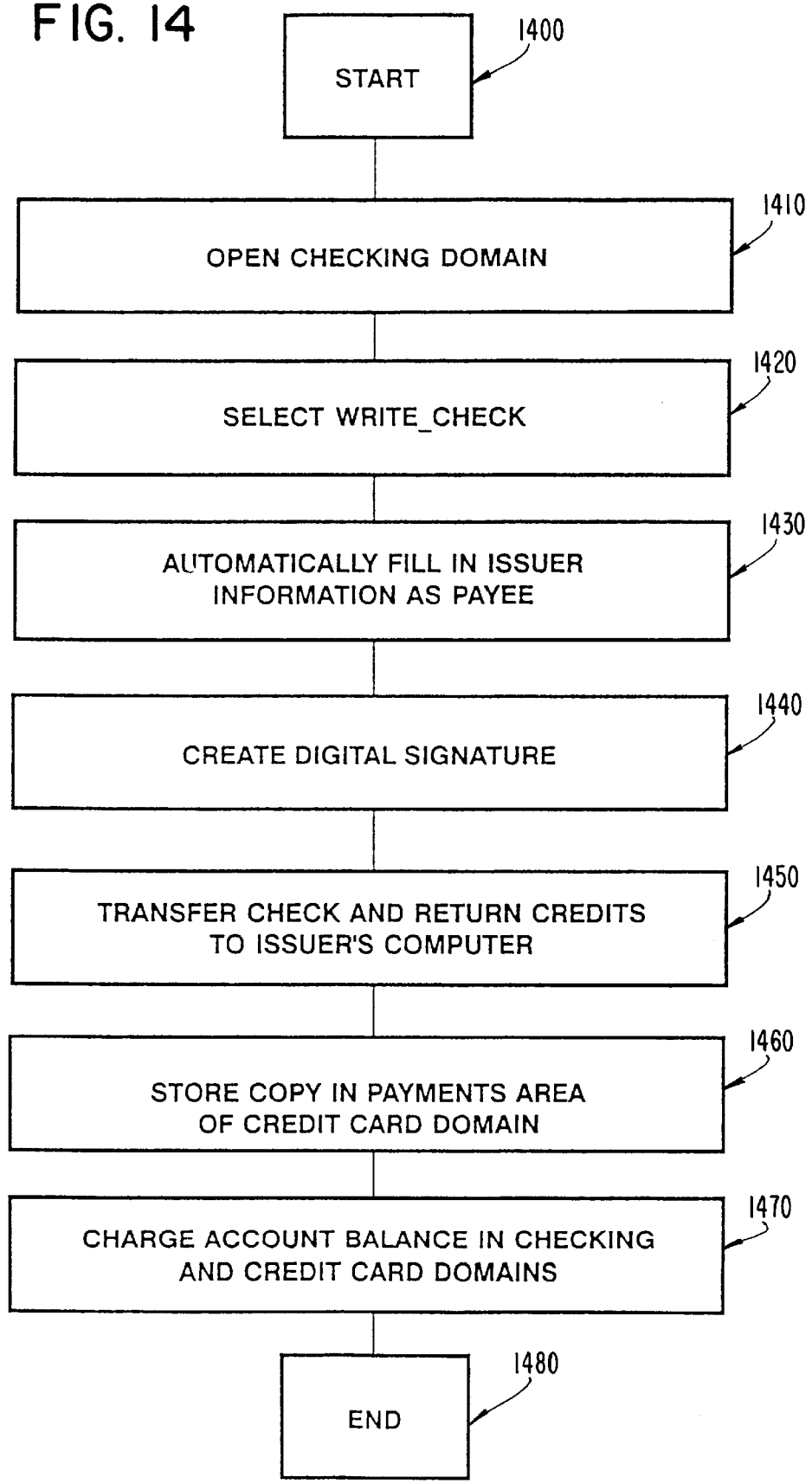
FIG. 14 is a flow chart of a Make_CC_Payment process.

FIG. 14 is a flow chart of a Make_CC_Payment process. The process begins (1400) and the checking domain is opened (1410) and the function Write_Check (1420) is selected. Since the credit card domain is open as well as the checking domain, the payee information may be read from the credit card domain and filled in into the payee location in the check form in the checking domain (1430). The check is signed with a digital signature (1440) and the electronic check together with any return credits are transferred to issuer's computer (1450) and a copy is stored in the payments area of the credit card domain (1460). The account balances in checking and credit card domains are adjusted by the amount of the payment (1470) and the process ends.

Figure 15:
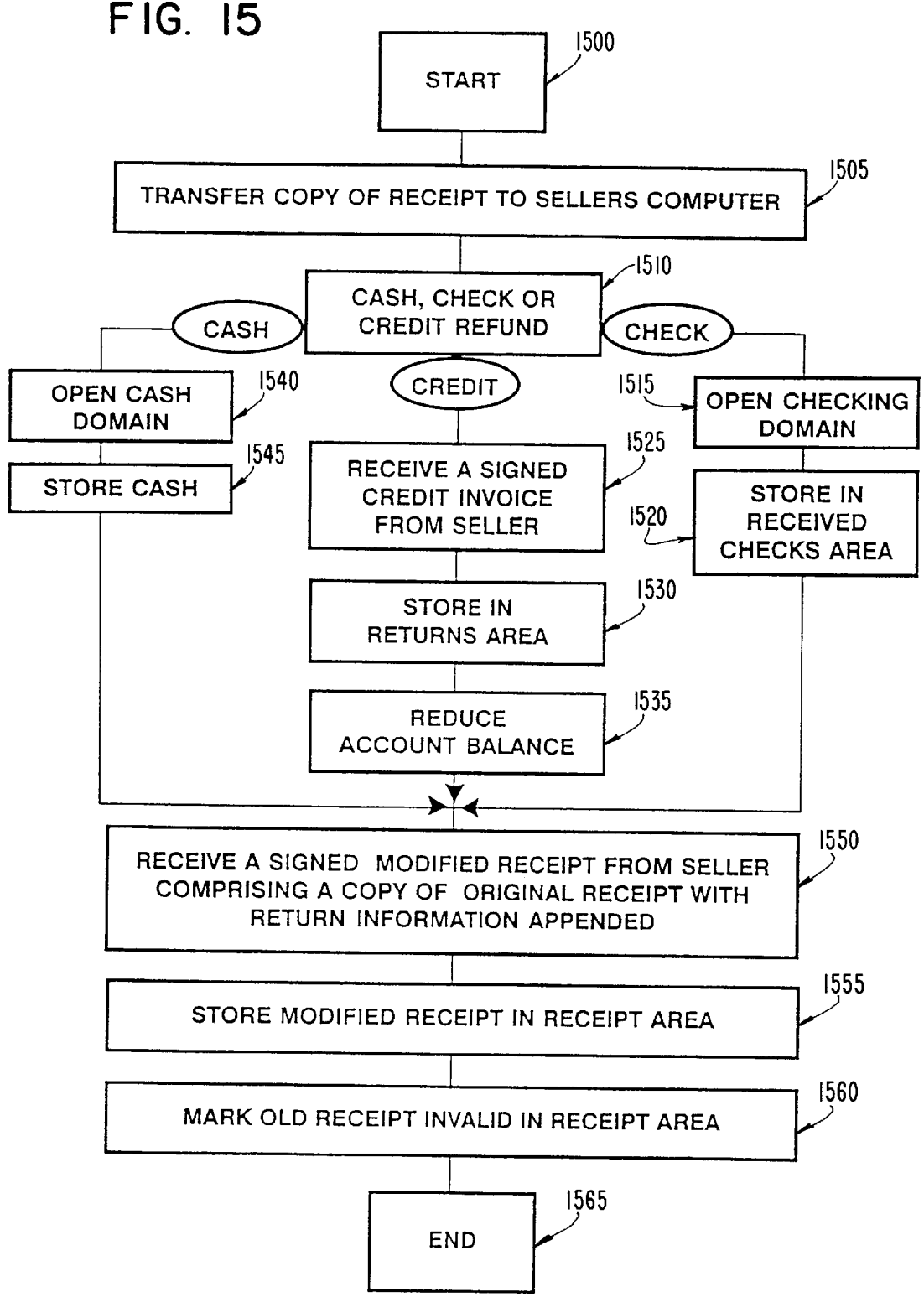
FIG. 15 is a flow chart of a Receive_CC_Credit process.

FIG. 15 is a flow chart of a Receive_CC_Credit process. The process begins (1500) and a copy of a stored receipt from the credit card domain is transferred to a seller's computer (1505). The type of refund to be received is determined (1510) and one of three branches of the process is taken depending on whether the return is cash, credit or check. If it is check, the checking domain is open (1515) and the electronic check for the return amount is stored in the area of received checks (1520). If the return is by way of credit memo, an electronically signed electronic credit invoice is received from the seller (1525) and stored in the returns area of the credit domain (1530) and the account balance for that domain is reduced (1535). If the return received is electronic cash, and the cash domain is open (1540) and the cash stored (1595). After the credited amount is transferred back to the user, the user will receive a signed, modified receipt from the seller comprising a copy of the original receipt with the return information appended (1550). The modified receipt is stored in the receipts area of the domain where the transaction originated (1555) and the old receipt is marked as invalid in view of the modified receipt (1560) and the process ends.

Figure 16:
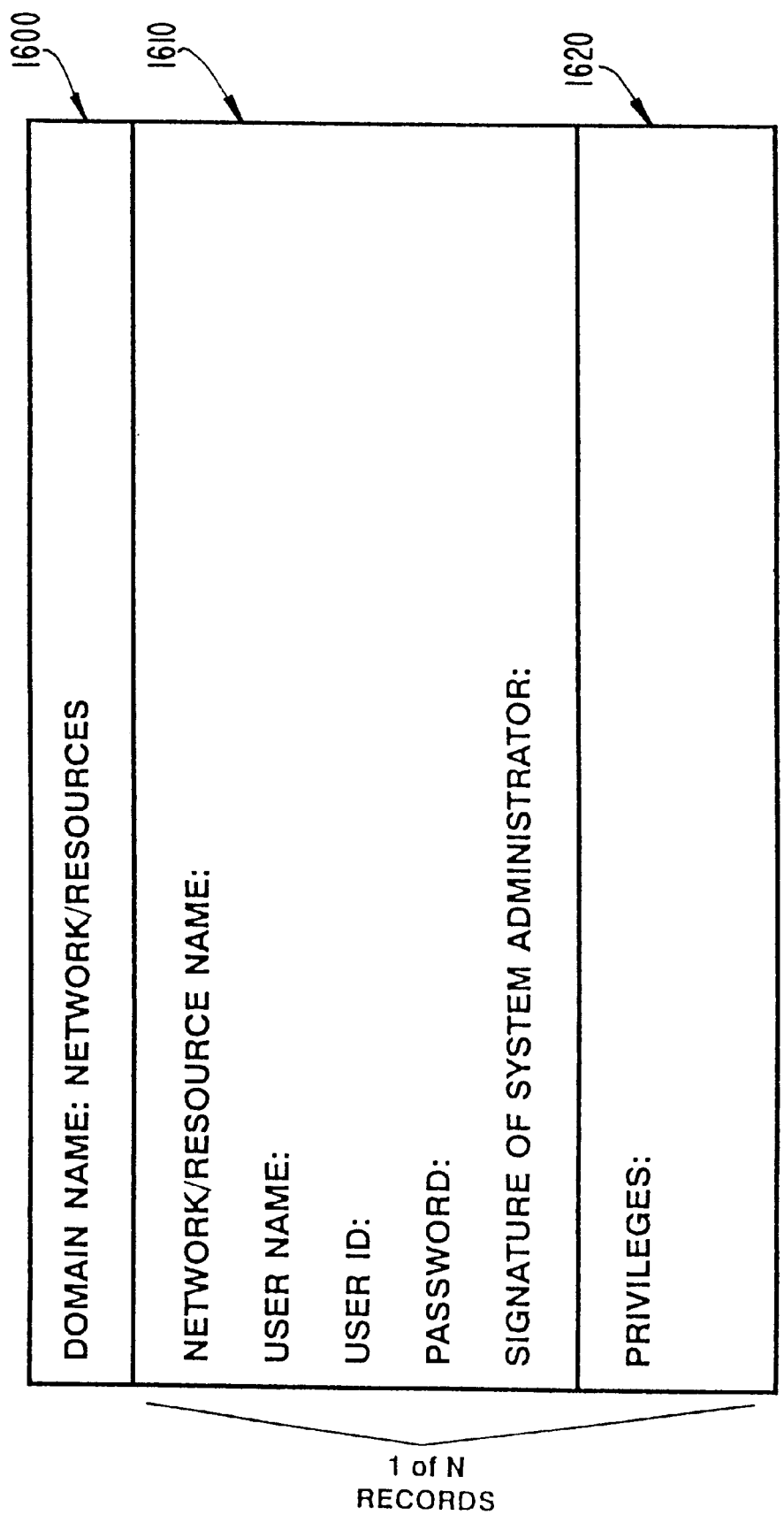
FIG. 16 is a representation of an exemplary layout for a network/computer resources access domain.

FIG. 16 is a representation of an exemplary layout for a network/computer resources domain. Since a number of different resources might be available to the smart token holder, this domain will consist of multiple data structures under a domain name heading (1600). Each record under the domain name heading will be like that shown in items 1610 and 1620. However, there will be one such data structure for each resource contained in the domain.

Figure 17:
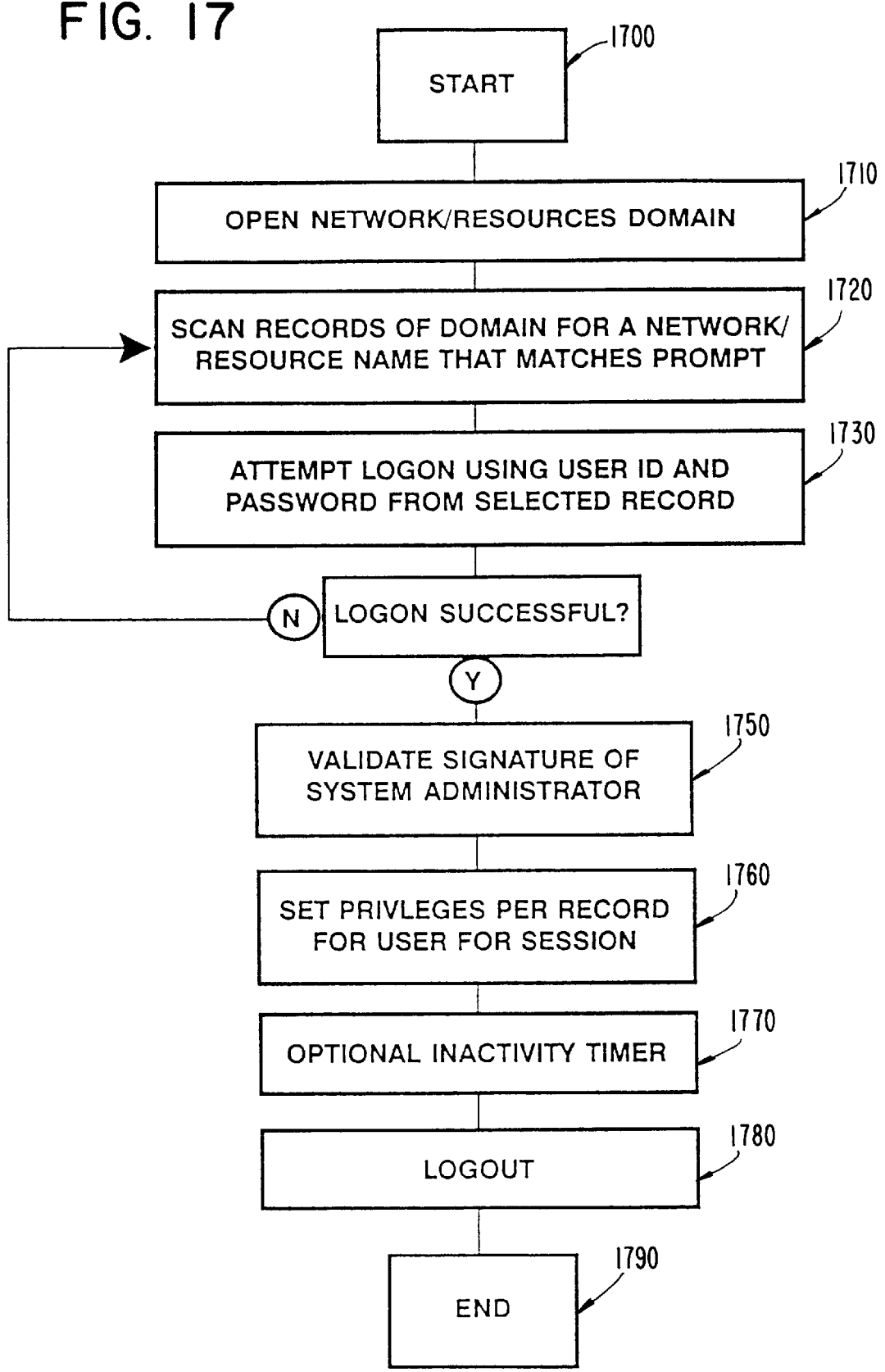
FIG. 17 is a flow chart of a logon sequence using the network/computer resources domain.

FIG. 17 is a flow chart of a logon sequence using the network/computer resources domain. The process starts (1700) and the domain is opened (1710). An exemplary embodiment, prompts reach system are unique and the records of the domain are scanned for a network/resource name that matches the prompt (1720). If one is found, an attempt to logon is made using the user ID and password from the selected record. If the logon is not successful (1740-N) scanning resumes. If it is successful (1740-Y), the signature of the system administrator is validated (1750) and privileges are set for the user in accordance with the privileges defined in the domain (1760). An optional inactivity timer (1770) determines whether or not the session should be continued. If it times out, the user has logged off the system (1780) and the process ends.

Figure 18:
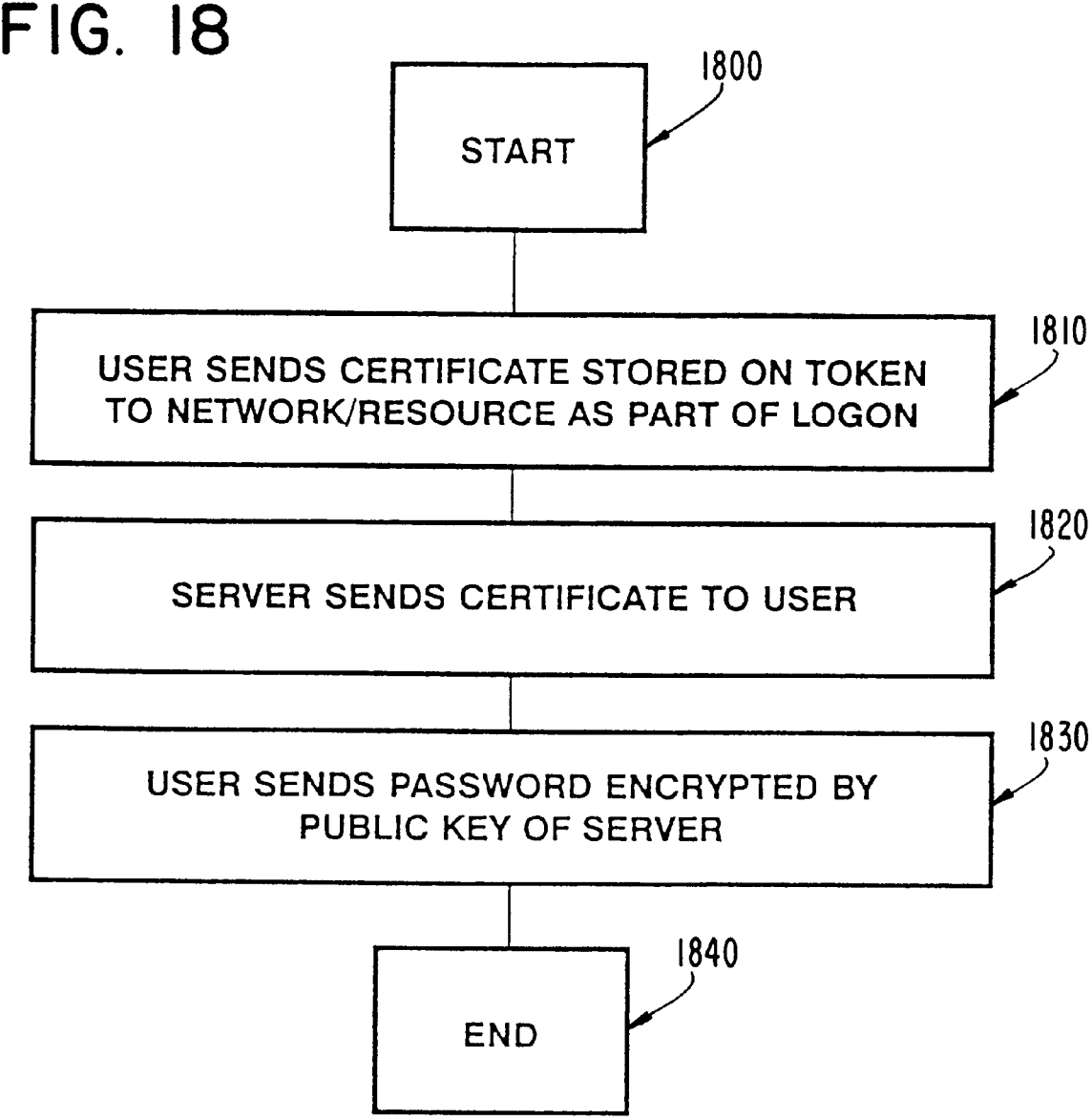
FIG. 18 is a flow cart of a simple authentication protocol which can be used with logon from the network/computer resources domain.

FIG. 18 is a flow chart of a simple authentication protocol used with logon from the network/computer resources domain. The process begins (1800) and the user sends a certificate stored on the token to the network/resources part of the logon process (1810). The server replies with a certificate to the user (1820) and the user sends a password encrypted by the public key on the certificate of the server to the server (1930) where it is decrypted and utilized to authorize the logon.

Figure 19:
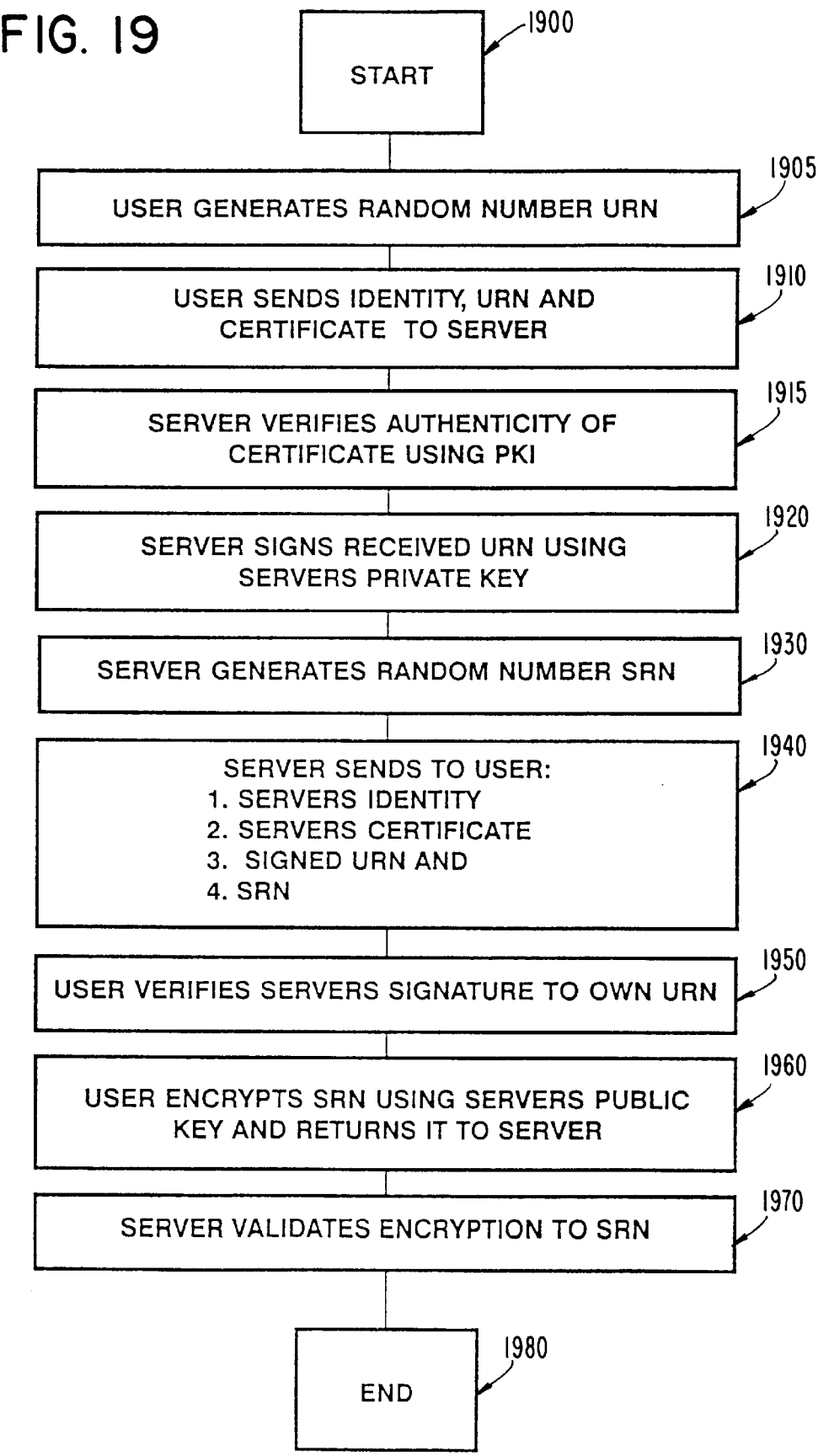
FIG. 19 is a flow chart of a strong authentication protocol used in a process of bilateral user/server authentication.

FIG. 19 is a flow chart of a strong authentication protocol used with logon using the network/computer resources domain. The process begins (1900) when the user generates a random number URN (1905) and sends it with his identity and certificate to the server (1910). The server verifies the authenticity of the certificate (1915) perhaps using the system and method described in U.S. Pat. No. 5,745,574. The server signs the received URN using the server's private key (2020): generates a random number, SRN (1930), and sends to the user the server's identity, the server's certificate, the signed URN and the SRN (1940). The user, upon receiving the package, verifies the signature to the URN it received (1950) and signs the SRN using the server's public key and returns it to the server. The server validates the signature to the SRN (1970) and the session is established.

Figure 20:
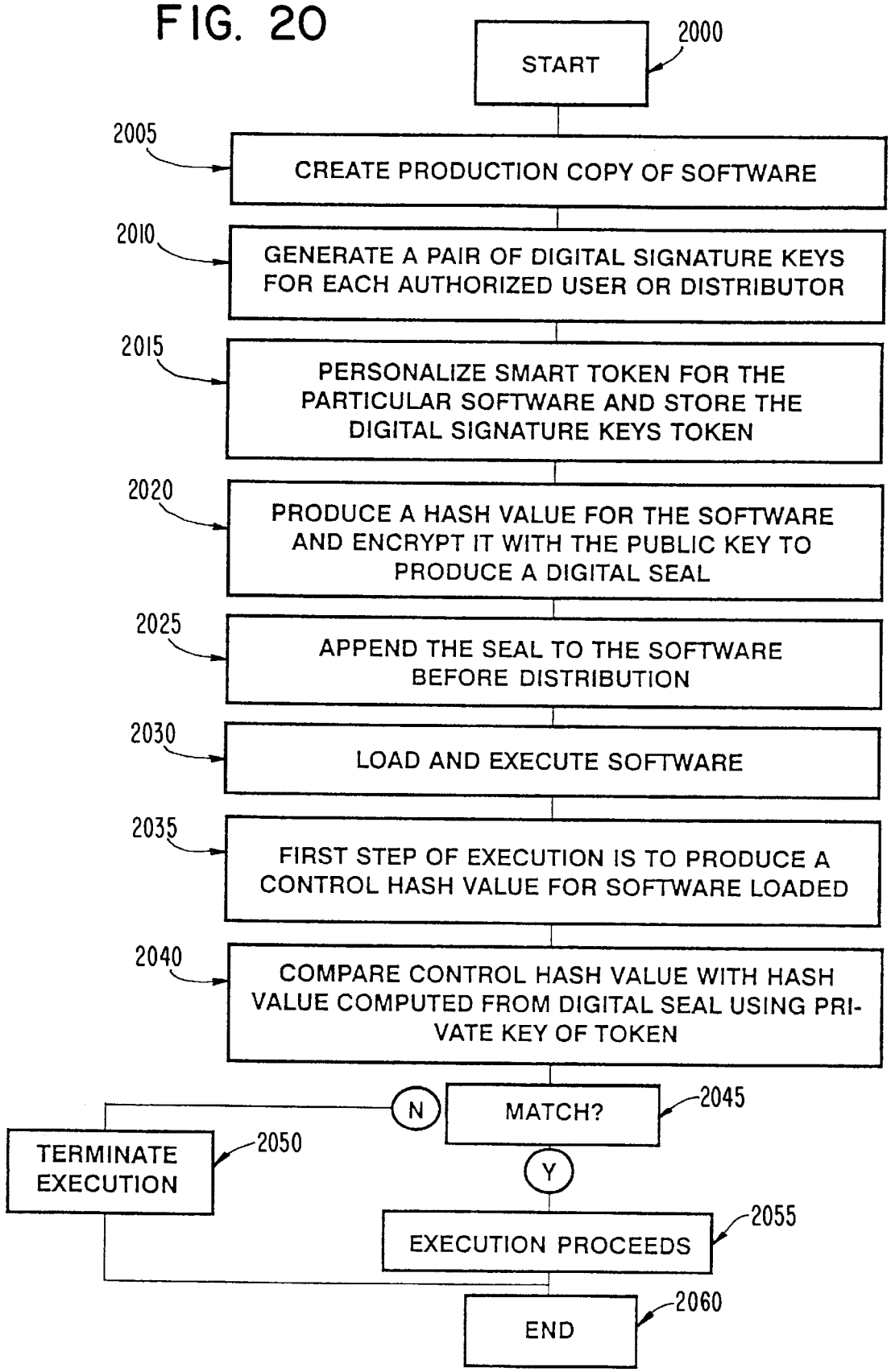
FIG. 20 is a flow chart of a process of ensuring only authorized use of software using a smart token.

FIG. 20 is a flow chart of a process for ensuring only authorized use of software using a smart token. The process begins (2000) by obtaining a clean reproduction copy of the software (2005). A pair of digital signature keys is generated for each authorized user or distributor (2010) and personalized for the particular software and stored on the smart token (2015). A hash value for the software is produced and encrypted with the public key to produce a digital seal (2020). The seal is appended to the software prior to distribution (2025) and the software and seal are loaded onto a medium for distribution (2025). When the software is loaded and executed (2030), the first step of execution is to produce a control hash value for the software on the medium (2035). That hash value is then compared with the hash value computed from the digital seal using the private key on the token (2040). If they do not match, execution is terminated (2050), but if they do (2045-Y), execution proceeds (2055) and the process ends.

Figure 21:
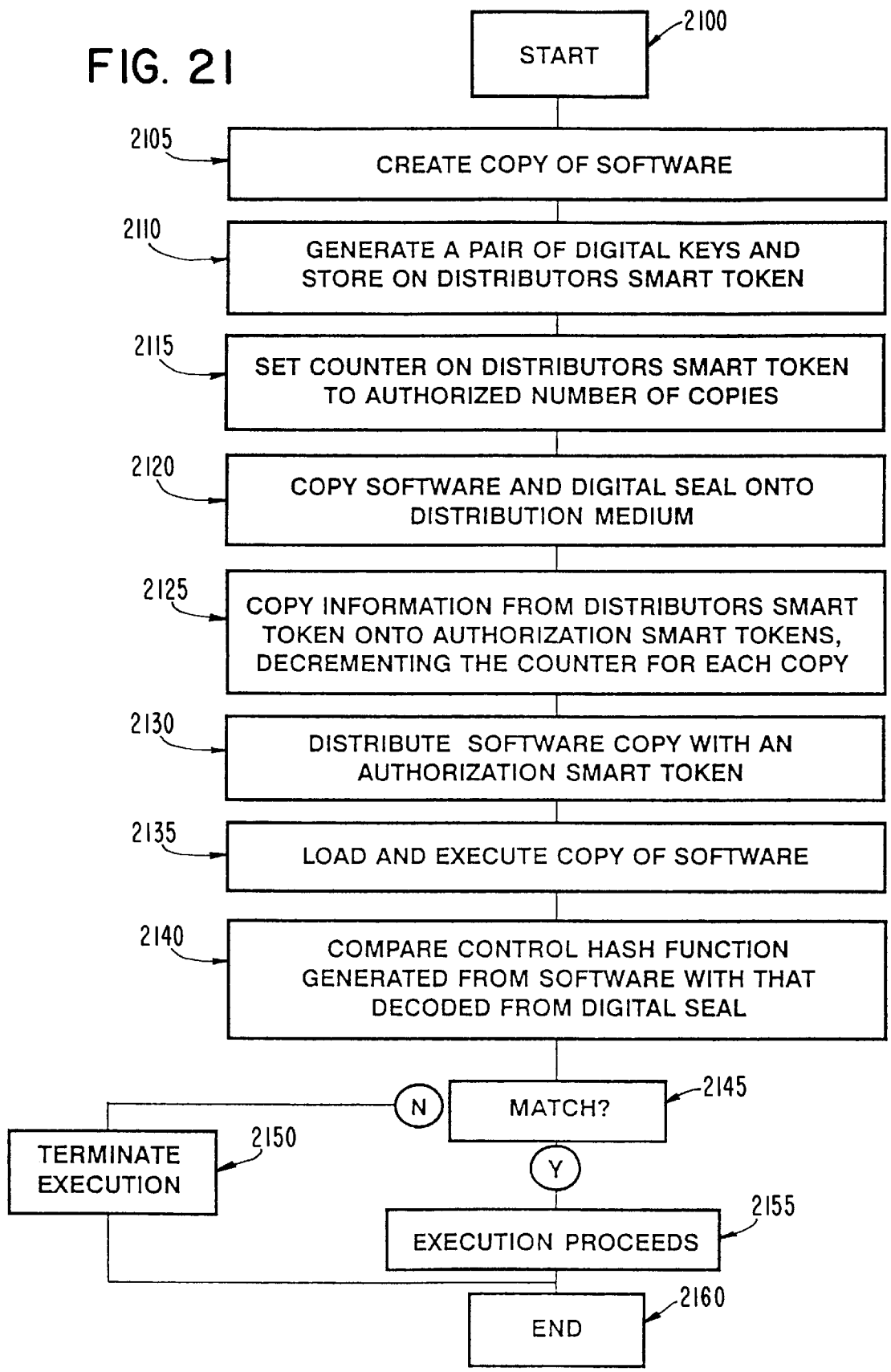
FIG. 21 is a flow chart of a process of limiting distribution and use of software to a certain number of users.

FIG. 21 is a flow chart of a process of limiting distribution and use of software to a certain number of uses. The process begins by obtaining a clean copy of the software (2105) and a pair of digital keys are generated and stored on distributor's smart tokens. In addition, the distributor's smart token includes a counter which is set to the authorized number of copies (2115). The original software, including the digital seal, can be copied onto N copies where N is the authorized number of copies (2120). The distributor's smart token is then utilized to copy the requisite keys onto authorization smart tokens to be associated with each copy of the software and, with each copy, the counter is decremented until no copies are left (2125). In that way, no more smart tokens can be made from the distributor's original token. Each copy of the software is then distributed with the authorization smart token containing the copied digital keys (2130). When the software is loaded and executed the same process discussed with respect to FIG. 21 is followed so that unless an authorization card contains the appropriate digital key, the software cannot be used.

Figure 22:
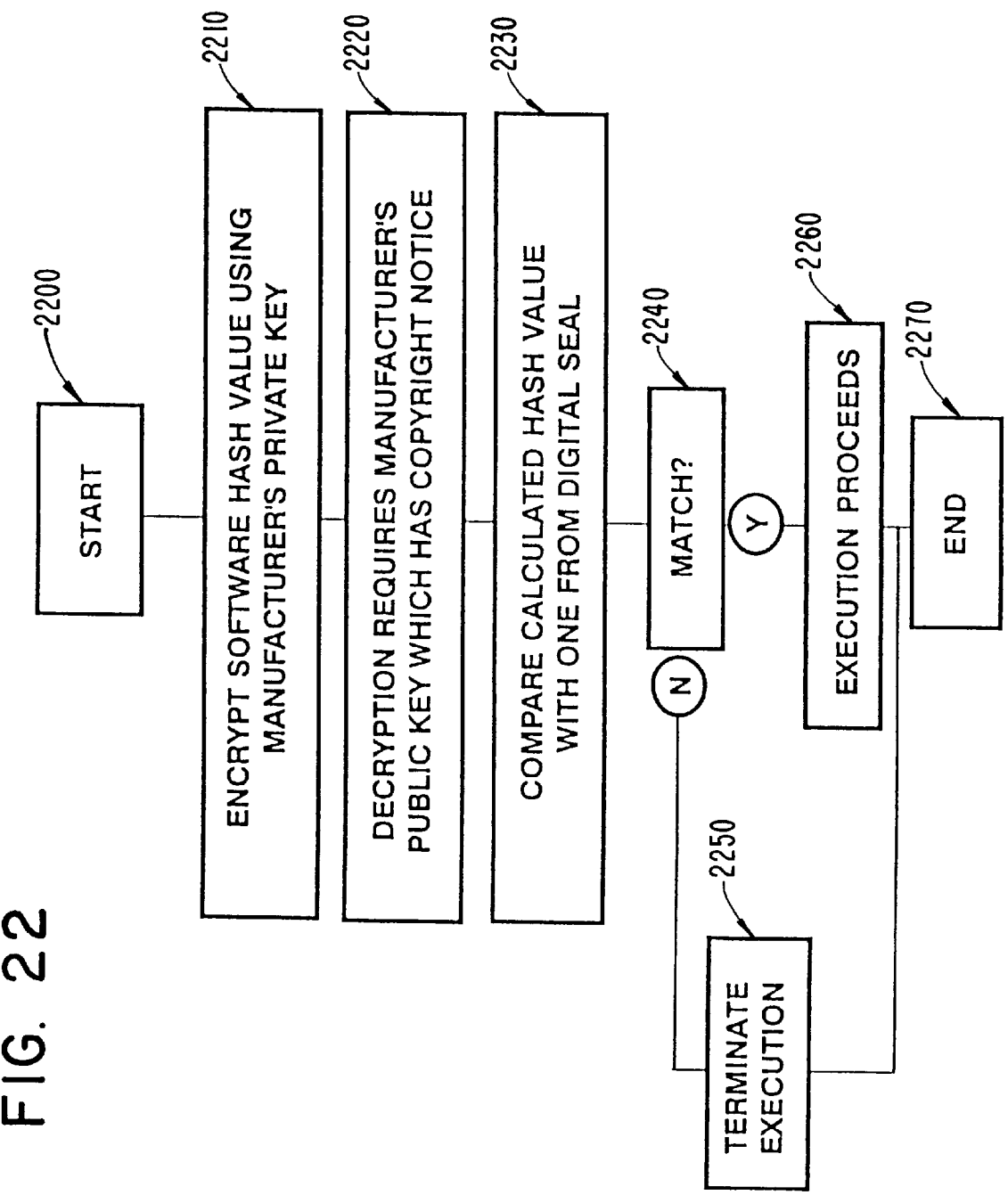
FIG. 22 is a flow chart of a process for ensuring display of a copyright notice and for ensuring no modification of the underlying software.

FIG. 22 is a flow chart of a process for ensuring display of a copyright notice and for ensuring no modification of the underlying software. The process begins by calculating a software hash value and encrypting it using the manufacturer's private key (2210). Decryption requires the manufacturer's public key which has a copyright notice embedded thereon which, as part of the process of retrieving the public key and decrypting the seal, results in a display of the copyright notice on the screen (2220). A calculated hash value is compared with the digital seal (2230) and the decision to terminate execution or to proceed with execution is made as in the prior two figures.

FIG. 23 is a representation of an exemplary layout of a credential domain. It is analogous to the earlier domains, described above, and may be utilized for things like documenting graduation from high school, college, graduate work, serving as a driver's license or a passport or birth certificate. In short, each individual acquires a number of credentials during their lifetime, some of which are necessary to document officially in ways that will permit the user to exercise the privileges and authorities which come with the credentials. Credentials may not only be positive, but may also be negative. Conviction of a felony would be an example of a negative credential. Since certain types of activities have certain qualifications, one could validate a person's qualifications against the credentials recorded in their smart token. This can be done by comparing requirements for the activity for which authorization is sought against the credentials to see if the token holder has credentials necessary to engage in the activity. For example, it might be desirable to know whether or not a person is certified as a brain surgeon before allowing him to perform surgery.

Figure 25:
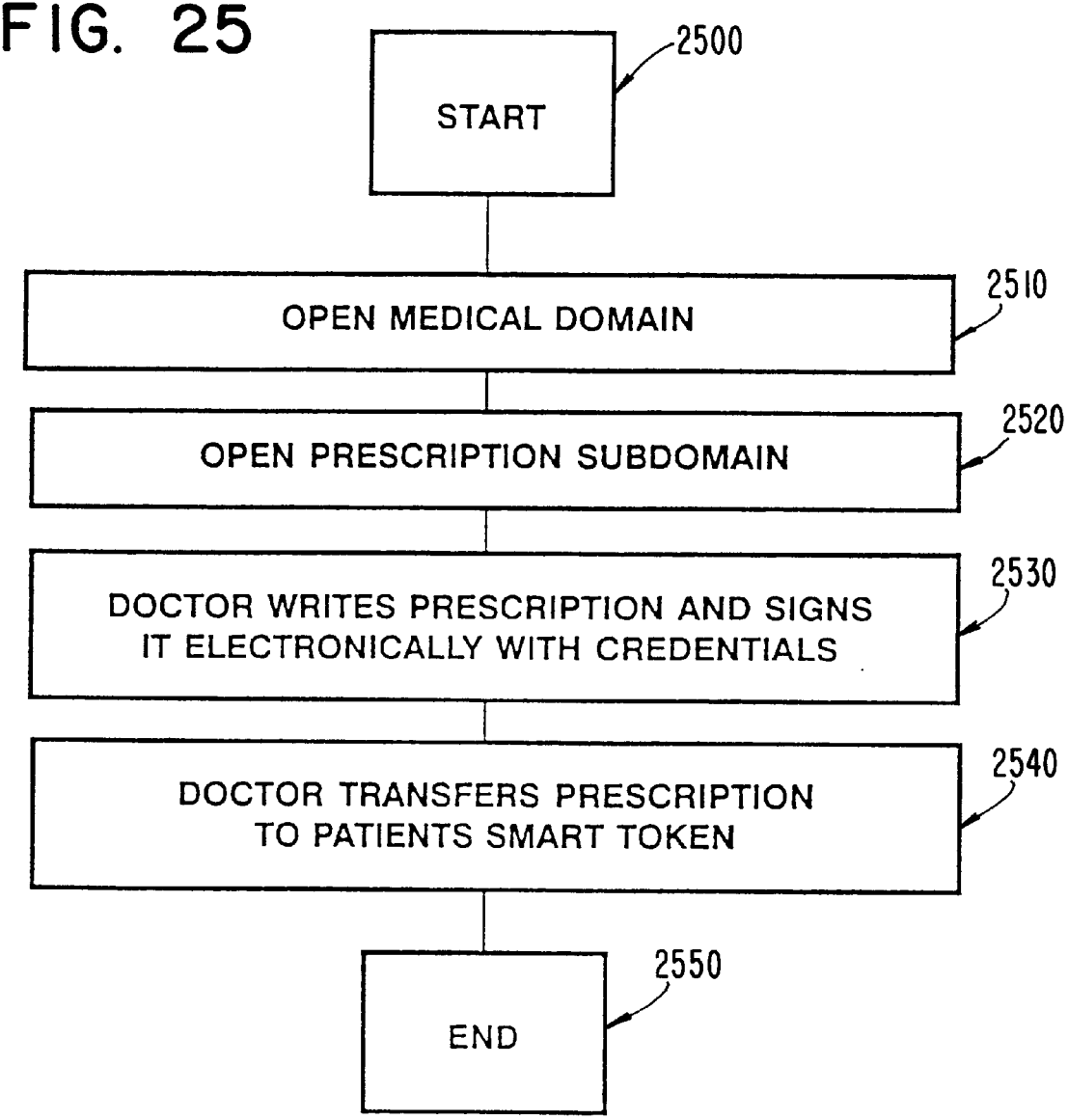
FIG. 25 is a flow chart of a Get_Prescription process.

FIG. 24 is a representation of an exemplary layout of a medical domain. The layout of such a domain will, of course, be affected by the functions for which the smart token is utilized in the medical area. For illustration purposes, only three functions are illustrated in the exemplary layout at 2550. The first is an edit information function which permits information to be added, deleted, or modified. The Get_Prescription and Fill_Prescription processes are described in conjunction with FIGS. 25 and 26. In FIG. 25, block 2510 includes personal information about the token holder. This could include descriptors such as height, weight, hair color, eyes, but in addition could contain an electronic photograph of the token holder as well as biometric information such as a scanned fingerprint or a scanned retinal pattern. The latter two are particularly useful for detecting unauthorized possessor's of the smart token. They can also be utilized as necessary keys for opening the token, so that an unauthorized user could not utilize the token inappropriately.

Block 2420 shows a list of allergies and medications being used by the token holder. Block 2530 shows a list of prescriptions which have been issued and those which have been filled. Block 2540 shows doctors' visits, and 2550 shows hospitalizations.

FIG. 25 is a flow chart of a Get_Prescription process. The process begins by opening the medical domain (2610) and the prescription sub domain (2620). It is particularly useful in the medical area to have individually controlled sub-domains so that only necessary information is available to those who have a need to know. At 2630, a doctor writes a prescription and signs it electronically using a private key, attaching, optionally, the credentials by which he is authorized to issue prescriptions and/or a certificate by which a signature can be authenticated. The doctor then transfers a prescription from the doctor's computer to the patient's smart token (2640) and the patient, therefore, has on his smart token an unfilled prescription.

Figure 26:
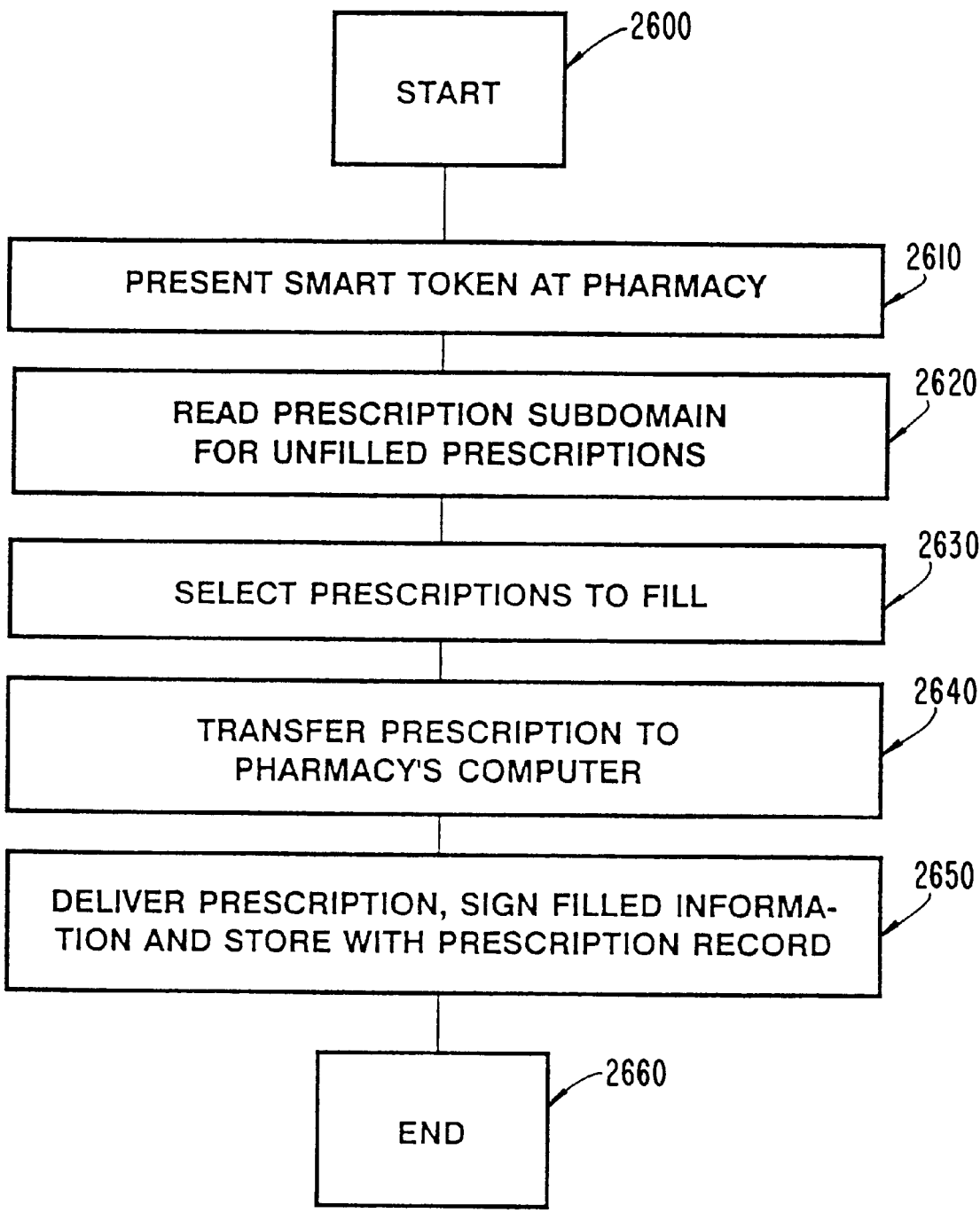
FIG. 26 is a flow chart of a Fill_Prescription process.

FIG. 26 is a flow chart of a Fill_Prescription process. The token holder presents his smart token at a pharmacy (2610), opens his medical domain and prescription sub domain and reads the unfulfilled prescriptions (2620). The holder selects the prescriptions to be filled (2630) and transfers them to the pharmacy's computer (2640). When the prescription is ready, the prescription is delivered to the token holder and information regarding the filling in of the prescription is filled out and then filled prescription information is transferred to the token holder's smart card after having been signed electronically by the storer or by the pharmacist who filled the prescription.

Public key encryption enables one to create the electronic equivalent of money. A customer can go to the bank with a smart token, and, instead of filling out a withdrawal slip and exchanging it for three one hundred dollar bills, the customer can create an electronic withdrawal form which he fills out and signs with his private key. The withdrawal form is transferred to the bank's computer where the bank verifies it using the token holder's public key. If, instead of returning one hundred dollar bills to the token holder, the bank were to take an electronic form by which it promised to pay to the bearer one hundred dollars and then sign that electronic token using the bank's private key, customers and merchants could verify the signed money orders using the bank's widely published public key.

A one hundred dollar bill is not much different from the signed money order referred to in the preceding paragraph. A hundred dollar bill contains indicia of authenticity in the form of a counterfeit resistant design and authorized signatures. If, instead of a bank, the U.S. Treasury were to issue electronic certificates signed by the U.S. Treasury's private key, these electronic certificates could be transferred from user to user just like one hundred dollar bills.

There are two types of digital cash. One is called identified digital cash and the other is anonymous digital cash. Identified digital cash contains information revealing the identity of the person who originally withdrew the money from the bank. Identified digital cash has a disadvantage that, like credit cards, it enables the bank to track the money as it moves through the economy.

Anonymous digital cash works Just like paper cash. Once anonymous digital cash is withdrawn from the bank, it can be spent without leaving a transaction trail. Anonymous digital cash is created by using numbered bank accounts (that is, a bank account with only a number for identification and not the name and address of the owner) and blind signatures. Blind signatures are discussed in the August, 1992 edition of *Scientific American* at pages 96–101.

There are two other ways of categorizing digital cash. On line digital cash requires one to interact with the bank via modem or network to conduct a transaction with a third party. off line digital cash can be transferred to a third party without directly involving a bank.

Off line, anonymous digital cash is the most complex form of digital cash because of the double spending problem. The double spending problem occurs because electronic monetary certificates can be copied very easily. Therefore, if one has a one hundred dollar certificate signed by a bank, it could be reproduced one hundred times and spent one hundred times. On-line digital cash systems prevent double spending by requiring merchants to contact a bank's computer with every sale. The bank maintains a data base of all the spent pieces of digital cash and can easily indicate to the merchants if a given piece of digital cash is still spendable. If the cash has already been spent, the merchant refuses the sale in a way similar to the way credit cards are currently verified.

There are at least two ways of overcoming the double spending problem with respect to electronic money. One way is to embed a special tamper proof chip into the smart card which would detect the attempt and would not permit the transaction.

The other way involves arranging the cryptographic protocols so that if a piece of cash is double spent, the act of double spending provides enough information that the double spender can be identified. Digital cash systems can accumulate the complete path that the digital cash has made through the economy. That is, the particulars of each transaction are appended to the piece of digital cash and travel with it as it moves from person to person. When the cash is finally deposited, the bank will check its data base to see if the piece of digital cash was double spent.

With off-line anonymous digital cash, if the digital cash was double spent, the information accumulated along the way, now accessible by virtue of the double spending, will identify the double spender. In this way, the identity of the spender is revealed only if the cash is double spent. If the cash is not double spent, the bank cannot determine the identity of the original spender nor can it reconstruct the path the cash took through the economy.

It is clear that some of the essential properties of electronic money tokens are:

1. monetary value,
2. exchangeability,
3. retrievability, and
4. tamper resistance.

Other desirable properties of electronic monetary tokens are divisibility, traceability, and the ability to make cash purchases in a convenient and easy manner.

The ability to link a smart token to its owner in ways that no one but the owner can use it, is an important characteristic of the system of the invention. As suggested above, any number of biometric measures may be utilized as a key to prevent anyone other than the actual owner from opening and accessing a smart token containing digital cash. Thus, in addition to the usual logon ID and password protection, a fingerprint comparison between the person attempting to open the token and one or more stored fingerprints could be necessary to access the contents of the token. A retinal scan is another method that could be used.

Another convenient feature of smart token digital cash is that most people could and probably would keep back up copies of their electronic bank notes, keys and other data. Thus, they could recover their funds if their token were lost or stolen. If stolen, the biometric links that prevent use of the token, and if lost, the back up copy is indistinguishable from the original.

Another characteristic of electronic money is that a variety of restrictions and limitations on use can be imposed. For example, if money were earmarked for educational expenses, the identifications of institutions where such money might be spent could be imposed as a restriction on the spendability of the electronic money. Therefore, a student at Anywhere University could spend the money at the bookstore at the university or at the university dining halls, but not at pool halls.

FIG. 27 is a representation of an exemplary layout for an electronic cash domain.

Block 2700 contains domain definition information as in the other domains. In this case, the current value field contains a summation of all certificates, such as that shown in Figure 2710 converted, using conversion values from the nationality stated to a desired currency value.

In the exemplary layout, a certificate includes the issuer name and issuer number, typically a bank name and bank number or the name and banking identification number of the national bank of the nation issuing the currency. The nationality is specified. The particular certificate illustrated in block 2710 is a certificate which can be divided into pieces and spent piece at a time. Thus, the original amount might have been a hundred dollar bill which was issued by some bank and the history section of block 2710 lists the amount, transferee and data and time of expenditure of pieces of the electronic currency spent to date. The amount remaining field is therefore a difference between the original amount the summation of the amount spent to date.

Block 2720 provides an area for convenient tracking of cash expenditures which will remain after the certificate listed in 2710 is exhausted or transferred. As before, blocks 2730 contain a list of functions associated with this domain, only two of which are shown for exemplary purposes, namely, Get_Cash and Pay_Cash.

Figure 28:
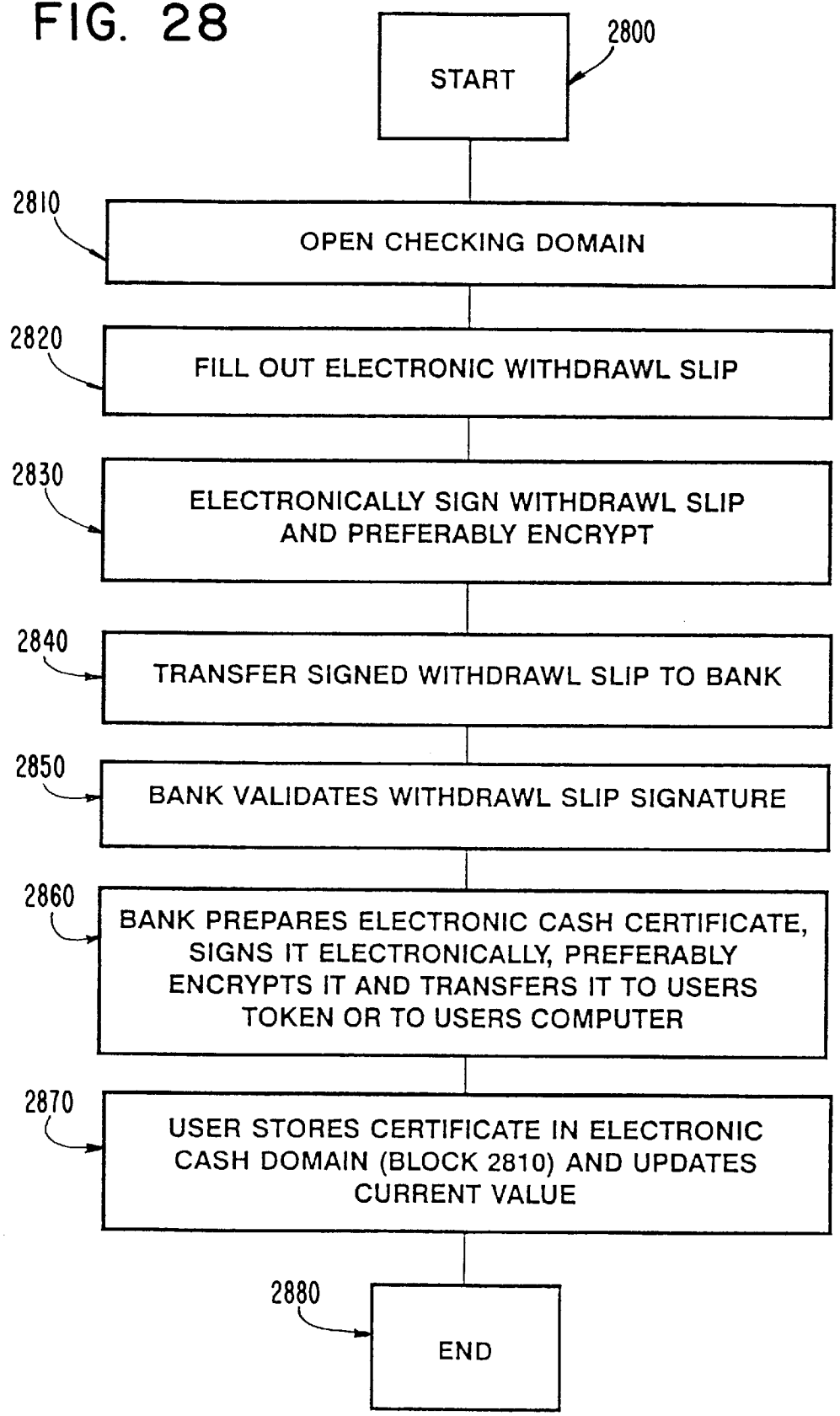
FIG. 28 is a flow chart of a Get_Cash process.

FIG. 28 is a flow chart of a Get_Cash process.

The process begins and a checking domain is opened (2810), an electronic withdrawal slip is filled out (2820), signed electronically (2830) and transferred to the bank (2840). The bank validates the withdrawal slip signature (2850) and prepares an electronic cash certificate which it signs electronically (2860) and transfers it to the user's token or to the user's computer for transfer to the user's token. The user stores the electronic cash certificate from the bank in the electronic cash domain (block 2810) and updates the current value (2870) and the process ends.

Figure 29:
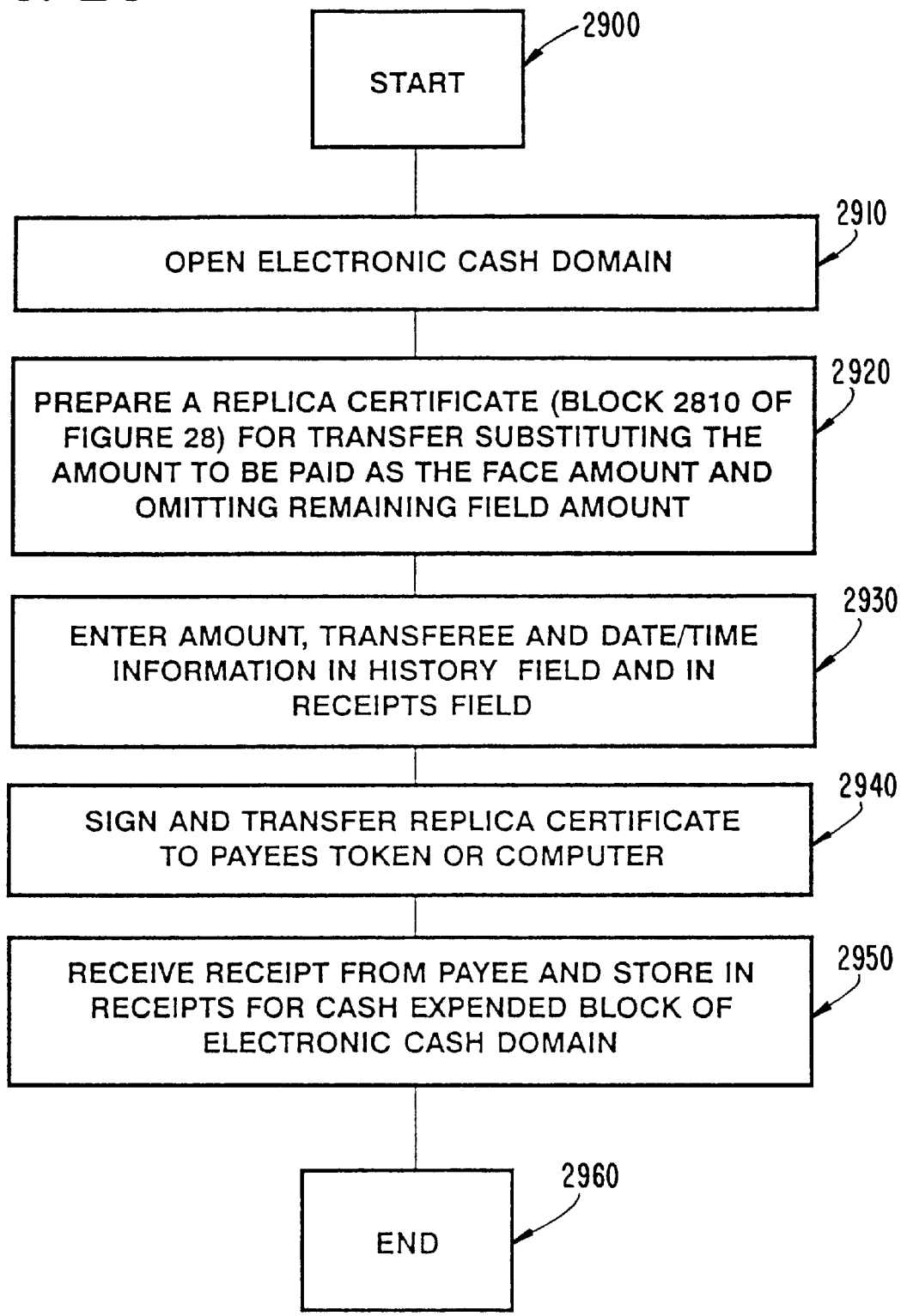
FIG. 29 is a flow chart of a Pay_Cash process.

FIG. 29 is a flow chart of a Pay_Cash process.

The process begins and Electronic_Cash domain is opened (2910). A replica certificate of block 2910 of FIG. 28 is prepared for transfer, substituting the amount to be paid as the face amount of the certificate being transferred and omitting the remaining amount field (2920). The amount, transferee and date/time information is entered into the history field and in the receipts field (2930). The entry in the receipts field is temporary pending transfer of a receipt from the payee. If no receipt is transferred, the entry becomes permanent. The replica certificate as modified is signed and transferred to the payee's token or to the payee's computer (2940). The payee sends a receipt (optionally) and such receipt is received and stored in the receipts for cash expended block of electronic cash domain of the purchaser's token.

In the way described, the electronic cash domain of the smart token can be utilized to perform what is essentially an electronic wallet function for holding electronic money.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

What is claimed is:

1. A method of obtaining access to computer or network resources using a smart token, comprising:
    a. opening an application domain of a smart token used for access to a computer or a network;
    b. encrypting a password read from the application domain, so as to obtain an electronic password;
    c. sending a logon identification and the encrypted password to the computer or network for which access is desired; and
    d. verifying and validating as to whether the logon identification and the encrypted password are such that the access to the computer or network is permitted,
    wherein the step of sending a logon identification to the computer or network for which access is desired comprises:
    a. sending a user public key certificate stored on the smart token together with a user identification and a user random number to the computer or network;
    b. receiving from the computer or network the identity of the computer or network, a public key certificate of a target resource, a signed copy of the user random number and a second random number generated by the computer or network;
    c. verifying the signed copy of the user random number; and
    d. signing the second random number using the public key of the computer or network obtained from a certificate and returning the second random number with signature to the computer or network.

2. A method of preventing use of software modified without authorization and unauthorized access to software without possession of a smart token, the method performed by software manufacture, author or owner, comprising:
    a. generating a pair of digital signature keys for each authorized user;
    b. personalizing a smart token for each authorized user of the software and storing the digital signature keys on said smart token;
    c. including a start-up routine within the software;
    d. producing a hash value for the software and encrypting the hash value to create an encrypted hash value using a user's public key to thereby create a digital seal; and e. appending the digital seal to the software before distribution;

such that when the software is loaded and executed, the start-up routine calculates a hash value to create a calculated hash value from the loaded software, compares the calculated hash value with a hash value decrypted from the digital seal using a private key on the smart token, and when they are identical, permitting execution of the software.

3. The method of claim 2 in which the steps of generating a pair of digital signature keys for each authorized user and personalizing a smart token for each authorized user and particular software to be protected, performed by software manufacturer, author or owner, comprise:

a. generating for each authorized software distributor a pair of digital signature keys and a distribution credential containing a counter holding a value indicating the maximum number of authorized copies of software to be distributed;

b. using said distribution credential to generate user authorization credentials in a quantity no greater than said value by decrementing said counter each time an user authorization credential is generated until the counter reaches zero and thereafter preventing further generation of said user authorization credentials;

c. distributing one user authorization credential with each authorized copy of said software;

d. preventing the possibility to activate the copy of the software without using a valid user authorization credential.

4. A method of displaying a copyright notice on software or a digital document, comprising:

a. applying a digital signature of a manufacturer, author or owner to the software or to the digital document at the time it is prepared for distribution;

b. permitting execution of the software or access to the the digital document only after successful verification of the digital signature of the manufacturer, author or owner using a public key of the manufacturer, the author, or the owner of the software, respectively; and c. not permitting access to the public key without display of a copyright notice.

* * * * *